(12) United States Patent
Du et al.

(10) Patent No.: US 12,620,890 B2
(45) Date of Patent: May 5, 2026

(54) TWO-STAGE CURRENT-LIMITING CONTROL STRATEGY FOR DIRECT-DROOP-CONTROLLED GRID-FORMING INVERTERS

(71) Applicant: BATTELLE MEMORIAL INSTITUTE, Richland, WA (US)

(72) Inventors: Wei Du, Richland, WA (US); Sheik Mohammad Mohiuddin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 260 days.

(21) Appl. No.: 18/639,637

(22) Filed: Apr. 18, 2024

(65) Prior Publication Data

US 2024/0275269 A1      Aug. 15, 2024

Related U.S. Application Data

(63) Continuation-in-part of application No. 18/241,739, filed on Sep. 1, 2023, now Pat. No. 12,388,344.

(Continued)

(51) Int. Cl.
H02M 1/32 (2007.01)
H02M 7/5395 (2006.01)

(52) U.S. Cl.
CPC ........... H02M 1/32 (2013.01); H02M 7/5395 (2013.01)

(58) Field of Classification Search
CPC .............................. H02M 1/32; H02M 7/5395

(Continued)

(56) References Cited

U.S. PATENT DOCUMENTS

| 5,798,633 A | 8/1998 | Larsen et al. |
| 7,577,006 B2 | 8/2009 | Neacsu |

(Continued)

FOREIGN PATENT DOCUMENTS

| EP | 1193852 | 9/2006 |
| EP | 1193852 B1 * | 9/2006 | ............ H02M 7/493 |

OTHER PUBLICATIONS

Ajala, et al., "Model Reduction for Inverters with Current Limiting and Dispatchable Virtual Oscillator Control", May 21, 2021, 11 pages.

(Continued)

*Primary Examiner* — Yemane Mehari
(74) *Attorney, Agent, or Firm* — Colby Nipper PLLC

(57) ABSTRACT

This document describes systems and techniques for a control system for a grid-forming inverter. In aspects, a reactive power current-limiting subsystem, based on a measured reactive power, is configured to generate a first signal representing a magnitude of a modulation waveform presentable to a pulse-width modulator configured to direct transistors in the inverter of the grid-forming inverter. An active power current-limiting subsystem, based at least in part on a measured active power, is configured to generate a second signal representing a rotating phase angle of the modulation waveform presentable to the pulse-width modulator. The reactive power current-limiting subsystem and active power current-limiting subsystem are configured to cause an alternating current (AC) output of the grid-forming inverter to resume a nominal form subsequent to current being directed around one or more transistors in an inverter to prevent an excessive output current from flowing through the one or more transistors.

20 Claims, 18 Drawing Sheets

Related U.S. Application Data

(60) Provisional application No. 63/460,780, filed on Apr. 20, 2023, provisional application No. 63/404,060, filed on Sep. 6, 2022.

(58) Field of Classification Search
USPC ........................................................ 323/282
See application file for complete search history.

(56) References Cited

U.S. PATENT DOCUMENTS

| | | | |
|---|---|---|---|
| 9,837,931 | B2 | 12/2017 | Luo et al. |
| 9,887,547 | B2 | 2/2018 | Liu et al. |
| 10,079,556 | B2 | 9/2018 | Ichikawa et al. |
| 10,756,536 | B2 | 8/2020 | Kral et al. |
| 10,879,785 | B2 | 12/2020 | Shuai et al. |
| 12,388,344 | B2 | 8/2025 | Du et al. |
| 2005/0030045 | A1 | 2/2005 | Deng et al. |
| 2014/0192567 | A1* | 7/2014 | Balocco ................... H02J 3/46 363/40 |
| 2017/0279376 | A1* | 9/2017 | Siri ................... H02M 7/53871 |
| 2018/0145582 | A1 | 5/2018 | Shuai et al. |
| 2023/0369865 | A1* | 11/2023 | Hart ....................... H02J 3/001 |
| 2024/0079947 | A1 | 3/2024 | Du et al. |

OTHER PUBLICATIONS

Crivellaro, et al., "Beyond low-inertia systems: Massive integration of grid-forming power converters in transmission grids", Nov. 7, 2019, 5 pages.

Du, et al., "A Comparative Study of Two Widely Used Grid-Forming Droop Controls on Microgrid Small-Signal Stability", Sep. 2019, 6 pages.

Du, Wei, "A Current Limiting Method for Single-Loop Voltage-Magnitude Controlled Grid-Forming Converters During Symmetrical Faults", 2022 IEEE Energy Conversion Congress and Exposition (ECCE), Sep. 2022, 7 pages.

Du, et al., "A Two-Stage Current Limiting Control Strategy for Improved Low-Voltage Ride-Through Capability of Direct-Droop-Controlled, Grid-Forming Inverters", 2023 IEEE Energy Conversion Congress and Exposition (ECCE), USA., Oct. 2023, 5 pages.

Du, et al., "Modeling of Grid-Forming and Grid-Following Inverters for Transient Stability Simulation of Large-Scale Distribution Systems", Feb. 2019, 8 pages.

Elkhatib, et al., "Evaluation of Inverter-based Grid Frequency Support using Frequency-Watt and Grid-Forming PV Inverters", Aug. 2018, 5 pages.

Erdocia, et al., "Dual Voltage-Current Control to Provide Grid-Forming Inverters with Current Limiting Capability", Dec. 2021, 12 pages.

Hernandez-Alvidrez, et al., "PV-Inverter Dynamic Model Validation and Comparison Under Fault Scenarios Using a Power Hardware-in-the-Loop Testbed", Nov. 2018, 6 pages.

Huang, et al., "Transient Stability Analysis and Control Design of Droop-Controlled Voltage Source Converters Considering Current Limitation", Sep. 2017, 13 pages.

Jin, et al., "A DQ-Frame Asymmetrical Virtual Impedance Control for Enhancing Transient Stability of Grid-Forming Inverters", IEEE Transactions on Power Electronics, vol. 37, No. 4, Nov. 2021, 10 pages.

Lasseter, et al., "Grid-Forming Inverters: A Critical Asset for the Power Grid", Jun. 2020, pp. 925-935.

Paquette, et al., "Virtual Impedance Current Limiting for Inverters in Microgrids with Synchronous Generators", Apr. 2015, pp. 1630-1638.

Qoria, et al., "Critical Clearing Time and Enhancement of Grid-Forming Converters Embedding Virtual Impedance as Current Limitation Algorithm", IEEE Transactions on Power Systems, vol. 37, No. 2, Dec. 2019, 10 pages.

Rokrok, et al., "Transient Stability Assessment and Enhancement of Grid-Forming Converters Embedding Current Reference Saturation as Current Limiting Strategy", IEEE Transactions on Power Systems, vol. 37, No. 2, Aug. 2021, 12 pages.

Rosso, et al., "On The Implementation of an FRT Strategy for Grid-Forming Converters Under Symmetrical and Asymmetrical Grid Faults", Jul. 2021, pp. 4385-4397.

Taul, et al., "Current Limiting Control With Enhanced Dynamics of Grid-Forming Converters During Fault Conditions", Jul. 2019, 12 pages.

Teng, et al., "A Current Limiting Method for Single-Loop Voltage-Magnitude Controlled Grid-Forming Converters During Symmetrical Faults", IEEE Transactions on Power Electronics, vol. 37, No. 4, Oct. 2021, 13 pages.

Wei, et al., "Survivability of Autonomous Microgrid during Overload Events", Apr. 2018, 9 pages.

Xin, et al., "Synchronous Instability Mechanism of P-f Droop-Controlled Voltage Source Converter Caused by Current Saturation", IEEE Transactions on Power Systems, vol. 31, No. 6, Feb. 2016, 2 pages.

"Notice of Allowance", U.S. Appl. No. 18/241,739, filed Jul. 1, 2025, 9 pages.

\* cited by examiner

900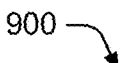

Generating a plurality of gate signals applicable to a plurality of transistors in the grid-forming inverter to cause the grid-forming inverter to generate a plurality of output currents combinable to form an alternating current
902

Comparing an inverter-maximum transient output current with the plurality of output currents to generate an overcurrent signal, the overcurrent signal presenting a fault signal responsive to one of the plurality of output currents flowing through at least one of the transistors exceeding the inverter-maximum transient output current
904

Responsive to the fault signal being presented, replace one or more of the gate signals with one or more modified gate signals to disable a gate of one or more of the plurality of transistors
906

Applying the one or more modified gate signals to disable to prevent the output current from flowing through the at least one of the transistors
908

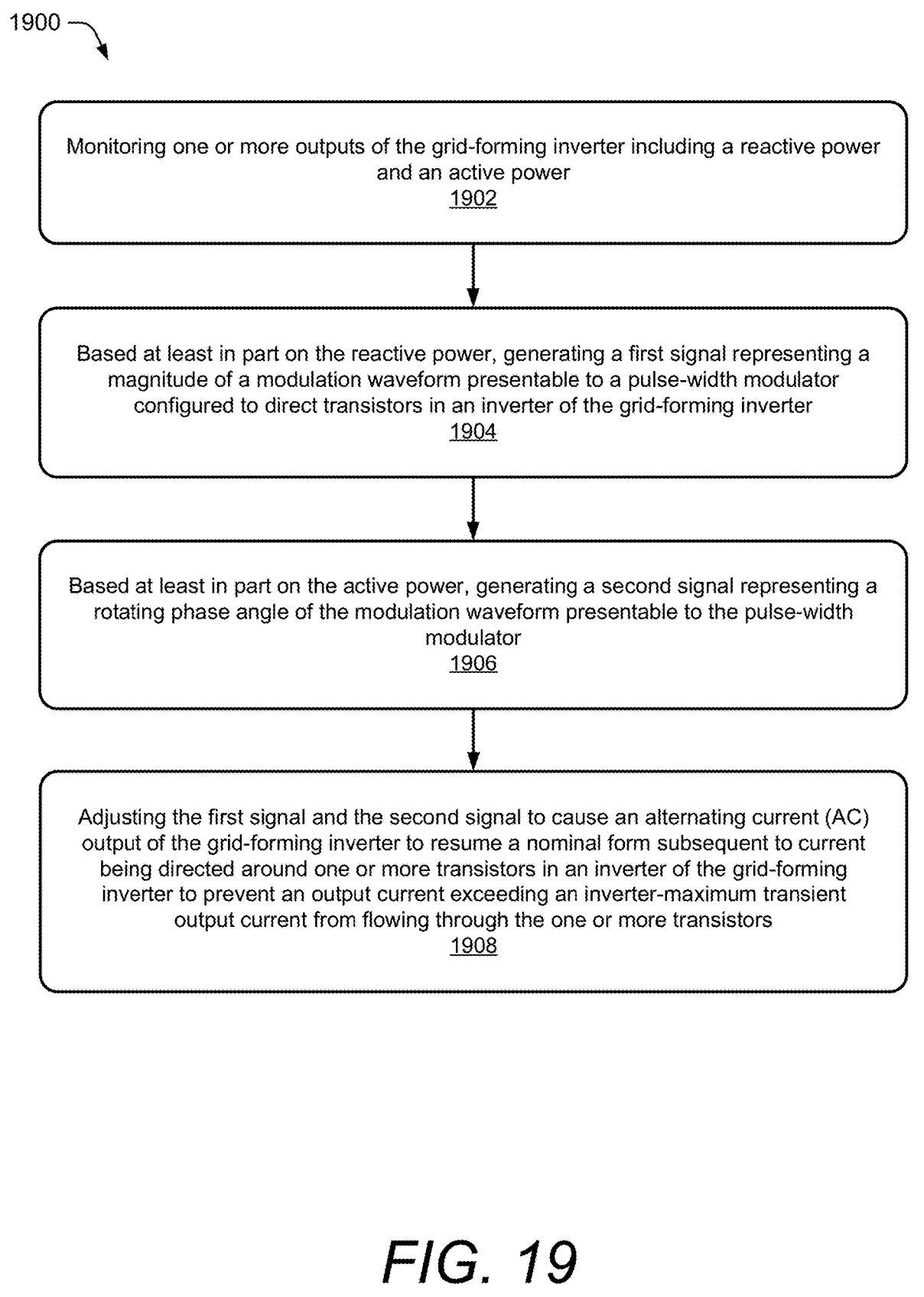

Monitoring one or more outputs of the grid-forming inverter including a reactive power and an active power
1902

Based at least in part on the reactive power, generating a first signal representing a magnitude of a modulation waveform presentable to a pulse-width modulator configured to direct transistors in an inverter of the grid-forming inverter
1904

Based at least in part on the active power, generating a second signal representing a rotating phase angle of the modulation waveform presentable to the pulse-width modulator
1906

Adjusting the first signal and the second signal to cause an alternating current (AC) output of the grid-forming inverter to resume a nominal form subsequent to current being directed around one or more transistors in an inverter of the grid-forming inverter to prevent an output current exceeding an inverter-maximum transient output current from flowing through the one or more transistors
1908

*FIG. 19*

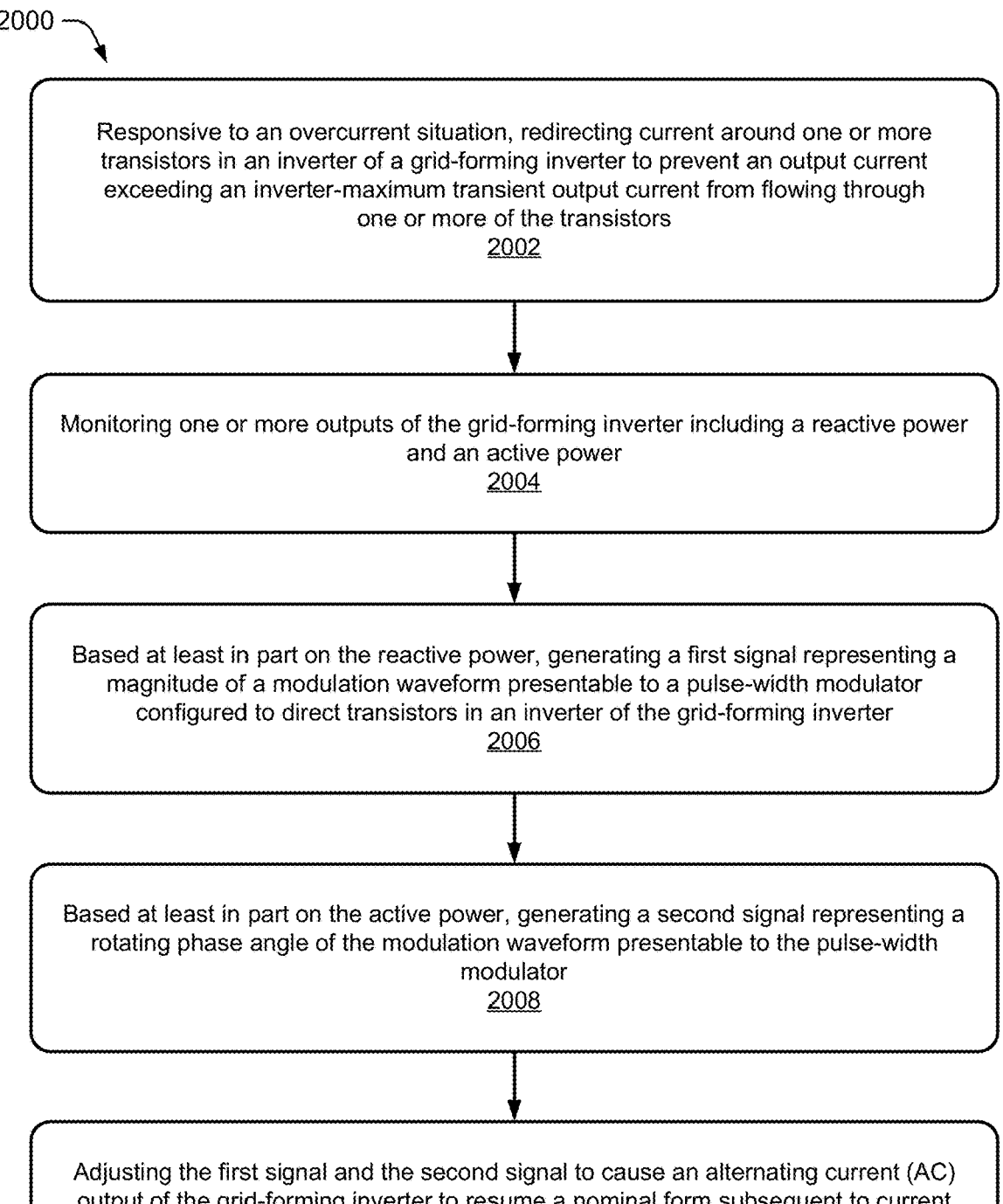

2000

Responsive to an overcurrent situation, redirecting current around one or more transistors in an inverter of a grid-forming inverter to prevent an output current exceeding an inverter-maximum transient output current from flowing through one or more of the transistors
2002

Monitoring one or more outputs of the grid-forming inverter including a reactive power and an active power
2004

Based at least in part on the reactive power, generating a first signal representing a magnitude of a modulation waveform presentable to a pulse-width modulator configured to direct transistors in an inverter of the grid-forming inverter
2006

Based at least in part on the active power, generating a second signal representing a rotating phase angle of the modulation waveform presentable to the pulse-width modulator
2008

Adjusting the first signal and the second signal to cause an alternating current (AC) output of the grid-forming inverter to resume a nominal form subsequent to current being directed around one or more transistors in an inverter of the grid-forming inverter to prevent an output current exceeding the inverter-maximum transient output current from flowing through the one or more transistors
2010

*FIG. 20*

TWO-STAGE CURRENT-LIMITING CONTROL STRATEGY FOR DIRECT-DROOP-CONTROLLED GRID-FORMING INVERTERS

INCORPORATION BY REFERENCE

This application claims the benefit of U.S. Provisional Patent Application No. 63/404,060 (the "First Provisional Application"), filed Sep. 6, 2022, U.S. Provisional Patent Application No. 63/460,780, filed Apr. 20, 2023 (the "Second Provisional Application"), and U.S. patent application Ser. No. 18/241,739, filed Sep. 1, 2023 (the "Non-Provisional Application"). This application incorporates by reference the entirety of the First Provisional Application, the Second Provisional Application, and the Non-Provisional Application.

STATEMENT AS TO RIGHTS TO DISCLOSURES MADE UNDER FEDERALLY-SPONSORED RESEARCH AND DEVELOPMENT

This disclosure was made with U.S. Government support under Contract DE-AC0576RL01830 awarded by the U.S. Department of Energy. The U.S. Government has certain rights in the invention.

BACKGROUND

Grid-forming inverters are increasingly used to improve the stability of a power grid by enabling renewable power sources to supply power to the power grid to supplement conventional generating sources. Most renewable sources, such as solar power systems and wind power systems, typically provide sources of direct current (DC) power, either directly or via storage batteries in which the DC power generated is stored for later use. Although power grids operate using alternating current (AC) power, grid-forming inverters convert DC power sources to AC power for supply to the power grid.

To a power grid, a grid-forming inverter fundamentally behaves as a voltage source behind an impedance. A potential disadvantage of the grid-forming inverter is that transistors or other components of grid-forming inverters may be damaged during overcurrent episodes, such as occurrence of short circuits, if protective measures are not used.

Droop control is a widely used technique for managing current flow in a grid-forming inverter to one of most mature grid-forming control strategies. Two common forms of droop-control systems are multi-loop droop-controlled systems and single-loop droop-controlled systems. A multi-loop droop-controlled system typically controls the magnitude and frequency of an inverter filter capacitor voltage according to the droop laws using cascaded inner voltage and current loops to achieve fast control of the filter capacitor voltage. A single-loop droop-controlled system directly controls magnitude and frequency of a modulation waveform according to the droop laws without using a cascaded inner current loop. Multi-loop droop-controlled systems often focus on modifying a current reference of the cascaded inner current loop of multi-loop droop-controlled systems to limit overcurrent episodes, but these methods are not applicable to single-loop droop-controlled structures that do not use a cascaded inner current loop. A single-loop droop-controlled system—as the name may imply—is simpler in structure than a multi-loop droop-controlled system, but a single-loop droop-controlled system may be more vulnerable to over-current episodes than multi-loop droop-controlled systems.

Unfortunately, if protective measures are used to redirect excessive DC currents to protect components in the grid-forming inverter, such protective measures may disrupt the AC current that is generated by the grid-forming inverter. The grid-forming inverter combines the DC currents to generate a sinusoidal AC current. Thus, making changes to the DC currents could interfere with the ability of the grid-forming inverter to generate the sinusoidal AC current.

SUMMARY

This document describes systems and techniques for a control system for a grid-forming inverter. In aspects, a reactive power current-limiting subsystem, based on a measured reactive power, is configured to generate a first signal representing a magnitude of a modulation waveform presentable to a pulse-width modulator configured to direct transistors in the inverter of the grid-forming inverter. An active power current-limiting subsystem, based at least in part on a measured active power, is configured to generate a second signal representing a rotating phase angle of the modulation waveform presentable to the pulse-width modulator. The reactive power current-limiting subsystem and active power current-limiting subsystem are configured to cause an alternating current (AC) output of the grid-forming inverter to resume a nominal form subsequent to current being directed around one or more transistors in an inverter to prevent an excessive output current from flowing through the one or more transistors.

This Summary introduces simplified concepts related to systems and techniques for a control strategy for direct-droop-controlled grid-forming inverters, including instantaneous current-limiting as well as reactive and active current-limiting, as further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for a control strategy for direct-droop-controlled grid-forming inverters are described in this document with reference to the following drawings, wherein the same numbers are used throughout the drawings to reference like features and components:

FIG. 9 is a flow diagram of an example method of limiting current across one or more transistors in a grid-forming inverter;

FIG. 19 is a flow diagram of an example method of adjusting outputs of a grid-forming inverter subsequent to an excessive output current being prevented from flowing through one or more transistors; and FIG. 20 is a flow diagram of redirecting current around one or more transistors to prevent excessive current from flowing through the one or more transistors and subsequently adjusting outputs of the grid-forming inverter in response to the redirected currents.

DETAILED DESCRIPTION

Overview

This document describes systems and techniques for a two-stage current-limiting control strategy for direct-droop-controlled grid-forming inverters. In a first stage, responsive to an overcurrent situation, an instantaneous current-limiting subsystem may redirect the flow of current around one or more transistors in an inverter of a grid-forming inverter to prevent a current exceeding an inverter-maximum transient output current from flowing through one or more of the transistors. In a second stage, active and reactive current-limiting subsystems respond to the redirecting of currents around the one or more transistors that may disrupt the alternating current (AC) output generated by the grid-forming inverter. The active and reactive current-limiting subsystems use feedback outputs to adjust the waveform generated by the grid-forming inverter to correct for disruptions caused by the instantaneous current-limiting subsystem rerouting current around one or more transistors.

The instantaneous current-limiting subsystem utilizes a hysteresis module configured to compare an output current detected across one or more transistors in an inverter controlled by the single-loop droop converter with the inverter-maximum transient output current and to generate an overcurrent signal. The overcurrent signal presents a fault signal responsive to the output current exceeding the inverter-maximum transient output current. A logic array is configured to logically combine gate signals generated a pulse-width modulator to selectively direct the one or more transistors to allow the output current to flow therethrough with the overcurrent signal to present modified gate signals to the one or more transistors. The logic array is configured to replace one or more of the gate signals in the modified gate signals with a gate disable signal responsive to the overcurrent signal presenting the fault signal.

The active and reactive current-limiting subsystem receives, via low-pass filters, current, voltage, and power signals representative of the output of the grid-forming inverter and provides control signals to the pulse-width modulator that generates the gate signals to the transistors of the converter. The active and reactive current-limiting subsystem modulates the control signals to the pulse-width modulator to control the output of the grid-forming inverter to compensate for disruptions in current flows caused by the instantaneous current-limiting subsystem so that the grid-forming inverter produces sinusoidal AC current.

Figure 1:
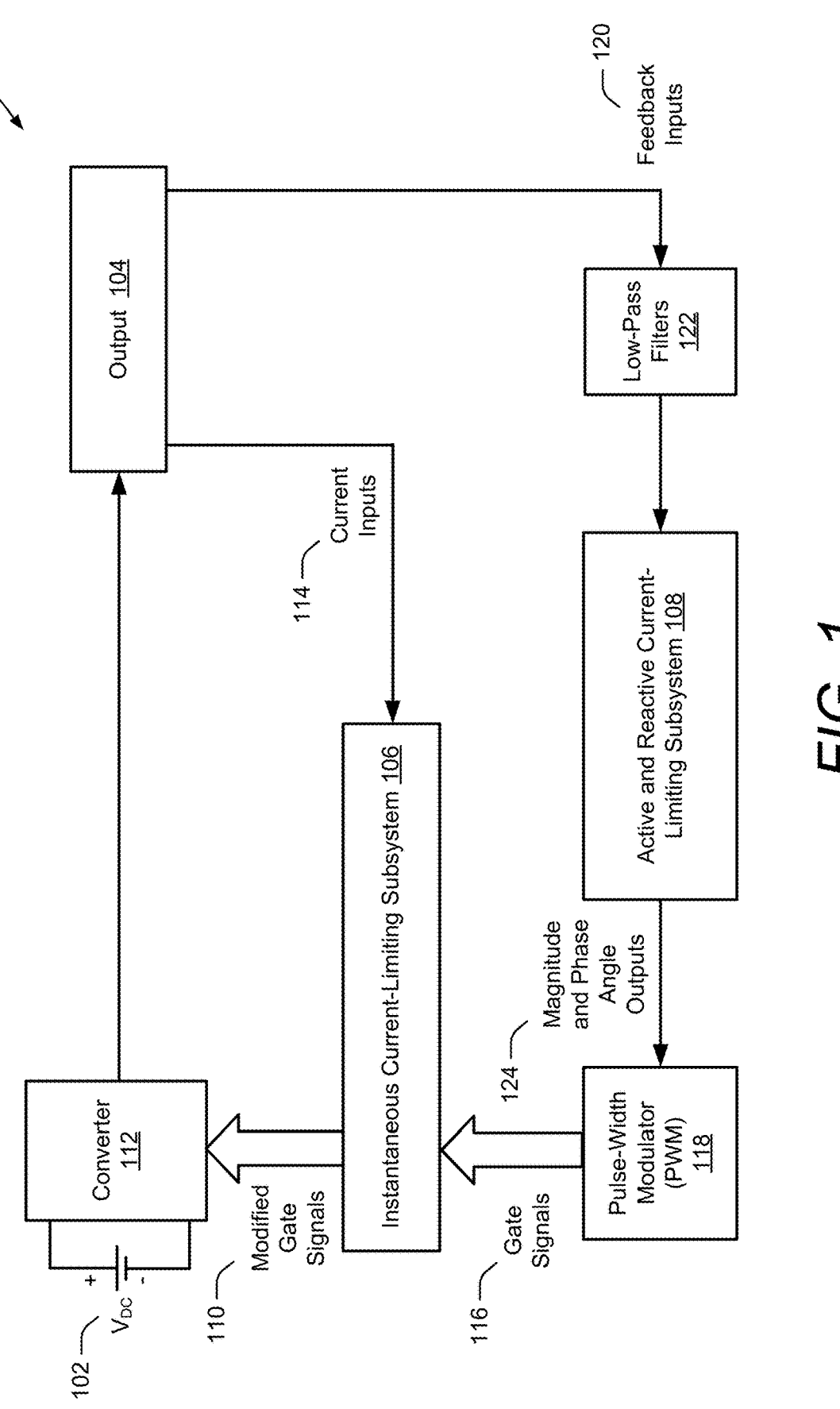
FIG. 1 is a block diagram of a grid-forming inverter including an instantaneous current-limiting system and active and reactive current-limiting systems.

Gate-Forming Inverter with Instantaneous Current-Limiting and Active and Reactive Current-Limiting Subsystems FIG. 1 illustrates a single-loop droop-controlled grid-forming inverter 100, such as may be used to couple a DC power source ($V_{DC}$) 102 to a power grid (not shown) at an output 104. The grid-forming inverter 100 includes an instantaneous current-limiting subsystem 106 and an active and reactive current-limiting subsystem 108. Because the grid-forming inverter 100 is configured in a single-loop configuration, both the instantaneous current-limiting subsystem 106 and the active and reactive current-limiting subsystem 108 receive signals from the output 104 of the grid-forming inverter 100 that are used to provide feedback control to direct operations of the grid-forming inverter 100.

The instantaneous current-limiting subsystem 106 selectively provides modified gate signals 110 to transistors (now shown in FIG. 1) in a converter 112 coupled to $V_{DC}$ 102 to redirect current around the transistors in an overcurrent situation, as described below. The instantaneous current-limiting subsystem 106 receives current inputs 114 from the output 104 of the grid-forming inverter 100. Based on the current inputs 114, the instantaneous current-limiting subsystem 106 determines whether it is appropriate to generate the modified gate signals 110 to the transistors of the converter 112.

The modified gate signals 110 are modified from gate signals 116 generated by a pulse-width modulator 118 operating under control of the active and reactive current-limiting subsystem 108. The active and reactive current-limiting subsystem 108 receives feedback inputs 120, including current, voltage, and power inputs from the output 104 of the grid-forming inverter 100. The feedback inputs 120 may be filtered by one or more low-pass filters 122 to, for example, reduce line noise prior to analog-to-digital conversion. The active and reactive current-limiting subsystem 108 generates magnitude and phase angle outputs 124 that are passed to the pulse-width modulator 118 that, in turn, generates the gate signals 116 to cause the converter 112 to generate the output 104 with a desired waveform. By responding to the feedback inputs 120, including current, voltage, and power inputs from the output 104 of the grid-forming inverter 100, the active and reactive current-limiting subsystem 108 is able to modulate the waveform of the output 104. Modulating the waveform of the output 104 may be particularly desirable subsequent to an overcurrent situation causing the instantaneous current-limiting subsystem 106 to generate the modified gate signals 110 which may protect transistors in the converter 112 but may result in the waveform of the output 104 being distorted. Thus, the instantaneous current-limiting subsystem 106 and the active and reactive current-limiting subsystem 108 work in concert both to protect the transistors of the converter 112 and to ensure that protecting the transistors does not prevent the grid-forming inverter from generating a suitable AC waveform.

Configuration and operation of the instantaneous current-limiting subsystem 106 and the active and reactive current-limiting subsystem 108 are described separately below.

Example of an Instantaneous Current-Limiting Subsystem

Figure 2:
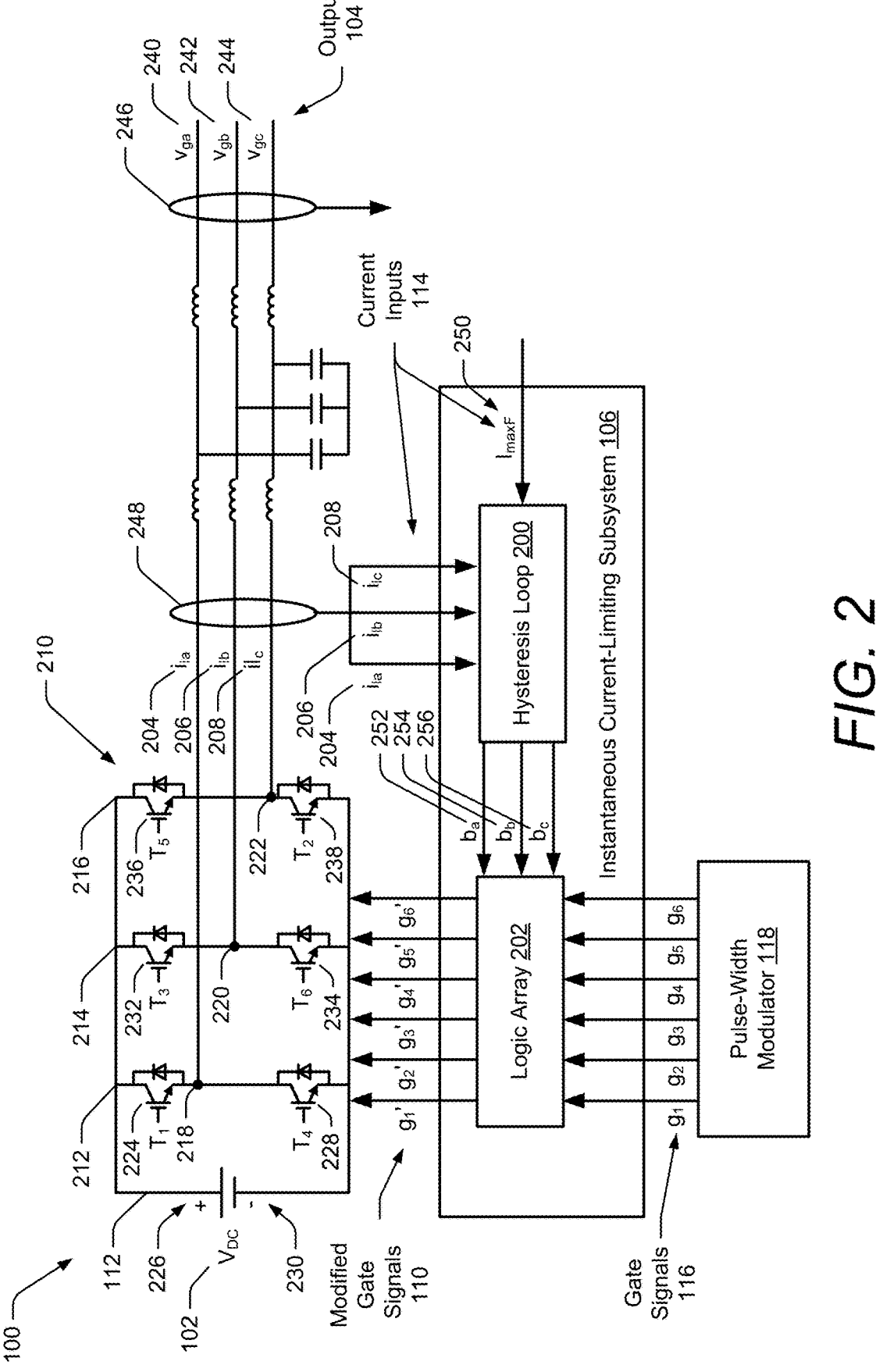
FIG. 2 is a schematic diagram of an embodiment of instantaneous current-limiting subsystem used in the grid-forming inverter of FIG. 1.

FIG. 2 is a schematic diagram of the single-loop droop-controlled grid-forming inverter 100 of FIG. 1 including an implementation of the instantaneous current-limiting subsystem 106. (The active and reactive current-limiting subsystem 108 are not shown in FIGS. 2-9, but are separately described below with reference to FIGS. 10-18.) Because the grid-forming inverter 100 is configured in a single-loop configuration, the instantaneous current-limiting subsystem 106 receives signals from the output 104 of the grid-forming inverter 100 that are used to provide feedback control to direct operations of the instantaneous current-limiting subsystem 106. The instantaneous current-limiting subsystem 106 generates the modified gate signals 110 based on a state of the gate signals 116 generated by a pulse-width modulator 118 controlled by the active and reactive current-limiting subsystem 108 (not shown in FIG. 2), as further described below.

The instantaneous current-limiting subsystem 106 includes a hysteresis loop 200 and a logic array 202. The hysteresis loop 200 and the logic array 202 are configured to monitor bridge-side output currents $i_{Ia}$ 204, $i_{Ib}$ 206, and $i_{Ic}$ 208 generated by an inverter 210 to detect and respond to overcurrent situations. An overcurrent situation is a situation in which one or more of the output currents $i_{Ia}$ 204, $i_{Ib}$ 206, and $i_{Ic}$ 208 exceed a maximum current threshold at or beyond which the output current may damage transistors or other components included in the inverter 210. Such conditions may arise, for example, during a short circuit or as a result of a power surge occurring at the DC power source $V_{DC}$ 102 which results in an excessive current or "fault current" flowing in the inverter 210. The instantaneous current-limiting subsystem 106 is configured to detect an overcurrent situation by responding to the one or more currents $i_{Ia}$ 204, $i_{Ib}$ 206, and $i_{Ic}$ 208 exceeding the maximum current threshold and redirecting fault currents before they can cause damage to the components of the inverter 210, as further described below.

The inverter 210, for purposes of this example, is a three-phase bridge inverter of a type commonly used to convert DC power into sinusoidal-wave AC power. The inverter 210 includes three branches 212, 214, and 216, each of which includes an output node 218, 220, and 222 at which the output currents $i_{Ia}$ 204, $i_{Ib}$ 206, and $i_{Ic}$ 208, respectively, are presented.

Each of the three branches 212, 214, and 216 includes a pair of transistors coupled to opposing sides of the DC power source $V_{DC}$ 102. The first branch 212 includes a high-side transistor $T_1$ 224 having its collector coupled to the positive side 226 of the DC power source $V_{DC}$ 102 and an emitter coupled to a collector of a low-side transistor $T_4$ 228. An emitter of the low-side transistor $T_4$ 228 is coupled to a negative side 230 of the DC power source $V_{DC}$ 102. The first output node 218 lies at the interconnection of the emitter of the high-side transistor $T_1$ 224 and the collector of the low-side transistor $T_4$ 228. The second branch 214 includes a high-side transistor $T_3$ 232 having its collector coupled to the positive side 226 of the DC power source $V_{DC}$ 102 and an emitter coupled to a collector of a low-side transistor $T_6$ 234 of which an emitter is coupled to the negative side 230 of the of the DC power source $V_{DC}$ 102. The second output node 220 lies at the interconnection of the emitter of the high-side transistor $T_3$ 232 and the collector of the low-side transistor $T_6$ 234. The third branch 216 includes a high-side transistor $T_5$ 236 having its collector coupled to the positive side 226 of the of the DC power source $V_{DC}$ 102 and an emitter coupled to a collector of a low-side transistor $T_2$ 238 of which an emitter is coupled to the negative side 230 of the of the DC power source $V_{DC}$ 102. The third output node 222 lies at the interconnection of the emitter of the high-side transistor $T_3$ 236 and the collector of the low-side transistor $T_2$ 238. In various aspects, each of the transistors 224, 228, 232, 234, 236, and 238 includes an insulated-gate bipolar transistor (IGBT) having a high capacity for carrying bipolar current between its collector and emitter.

As further described with reference to FIG. 3, gates of the transistors 224, 228, 232, 234, 236, and 238 of the different branches 212, 214, and 216 are selectively activated to generate the output currents $i_{Ia}$ 204, $i_{Ib}$ 206, and $i_{Ic}$ 208 at the output nodes 218, 220, and 222, respectively, that ultimately generate AC power at voltage outputs $V_{ga}$ 240, $V_{gb}$ 242, and $v_{gc}$ 244 at the output 104 of the grid-forming inverter 100. Depending upon the modified gate signals 110 applied to the gates of the transistors 224, 228, 232, 234, 236, and 238, the output currents $i_{Ia}$ 204, $i_{Ib}$ 206, and $i_{Ic}$ 208 flow across one or more of the transistors 224, 228, 232, 234, 236, and 238. An object of the instantaneous current-limiting subsystem 106 is to detect when one or more of the output currents $i_{Ia}$ 204, $i_{Ib}$ 206, and $i_{Ic}$ 208 presents a fault current that could damage one or more of the transistors 224, 228, 232, 234, 236, and 238 and then to apply signals to gates of the corresponding one or more of the transistors 224, 228, 232, 234, 236, and 238 to prevent the fault current from damaging the one or more of the transistors 224, 228, 232, 234, 236, and 238.

As is understood by those skilled in droop control, a single-loop droop-controlled grid-forming inverter 100 employs a sensor 246 to monitor the output 104 of the grid-forming inverter 100. In various implementations, the sensor 246 may be configured to monitor instantaneous active power, reactive power, voltage magnitude, or other quantities and present these signals to the one or more low-pass filters 122 (FIG. 1) for use by the active and reactive current-limiting subsystem 108 (FIG. 1), as described further below, that control the pulse-width modulator 118 in generating the gate signals $g_1$, $g_2$, $g_3$, $g_4$, $g_5$, and $g_6$ 116. The pulse-width modulator 118 generates the gate signals $g_1$, $g_2$, $g_3$, $g_4$, $g_5$, and $g_6$ 116 to control the transistors 224, 228, 232, 234, 236, and 238 in the inverter 210 to generate the output currents $i_{Ia}$ 204, $i_{Ib}$ 206, and $i_{Ic}$ 208. The pulse-width modulator 118 may be adapted to generate sinusoidal-wave AC power based on controlling the timing and magnitude of DC pulses presented at the output current nodes 218, 220, and 222. In a conventional single-loop droop-controlled grid-forming inverter (not shown), the gate signals $g_1$, $g_2$, $g_3$, $g_4$, $g_5$, and $g_6$ 116 would be presented directly to the transistors 224, 228, 232, 234, 236, and 238 in the inverter 210.

In various aspects, instead of presenting the gate signals $g_1$, $g_2$, $g_3$, $g_4$, $g_5$, and $g_6$ 116 directly to the transistors 224, 228, 232, 234, 236, and 238 in the inverter 210, the gate signals $g_1$, $g_2$, $g_3$, $g_4$, $g_5$, and $g_6$ 116 are presented to the instantaneous current-limiting subsystem 106. The instantaneous current-limiting subsystem 106 is coupled with a current sensor 248 configured to monitor the output currents $i_{Ia}$ 204, $i_{Ib}$ 206, and $i_{Ic}$ 208 flowing between the output nodes 218, 220, and 222. As described in detail below, the hysteresis loop 200 compares the output currents $i_{Ia}$ 204, $i_{Ib}$ 206, and $i_{Ic}$ 208 with $I_{maxF}$ 250, the inverter-maximum transient output current, and generates corresponding overcurrent signals $b_a$ 252, $b_b$ 254, and $b_c$ 256. When the hysteresis loop 200 detects that one or more of the output currents $i_{Ia}$ 204, $i_{Ib}$ 206, and $i_{Ic}$ 208 exceed the inverter-maximum transient output current $I_{maxF}$ 250, the hysteresis loop 200 causes one or more of the overcurrent signals $b_a$ 252, $b_b$ 254, and $b_c$ 256 to present a fault signal.

In various aspects, the logic array 202 receives the gate signals $g_1$, $g_2$, $g_3$, $g_4$, $g_5$, and $g_6$ 116 from the pulse-width modulator 118 and the overcurrent signals $b_a$ 252, $b_b$ 254, and $b_c$ 256 and logically combines corresponding signals. Responsive to one or more of the overcurrent signals $b_a$ 252, $b_b$ 254, and $b_c$ 256 presenting the fault signal, the logic array 202 replaces one or more of the gate signals $g_1$, $g_2$, $g_3$, $g_4$, $g_5$, and $g_6$ 116 presented by the pulse-width modulator 118 in the modified gate signals 110 (designated $g_1'$, $g_2'$, $g_3'$, $g_4'$, $g_5'$, and $g_6'$ in FIG. 2) with a gate disable signal. Presentation of the gate disable signal prevents the fault current detected at one or more of the output currents $i_{Ia}$ 204, $i_{Ib}$ 206, and $i_{Ic}$ 208 from flowing through one or more of the transistors 224, 228, 232, 234, 236, and 238. Instead of the fault current flowing through one or more of the transistors 224, 228, 232, 234, 236, and 238, the fault current is redirected, preventing the fault current from damaging one or more of the transistors 224, 228, 232, 234, 236, and 238.

Figure 3:
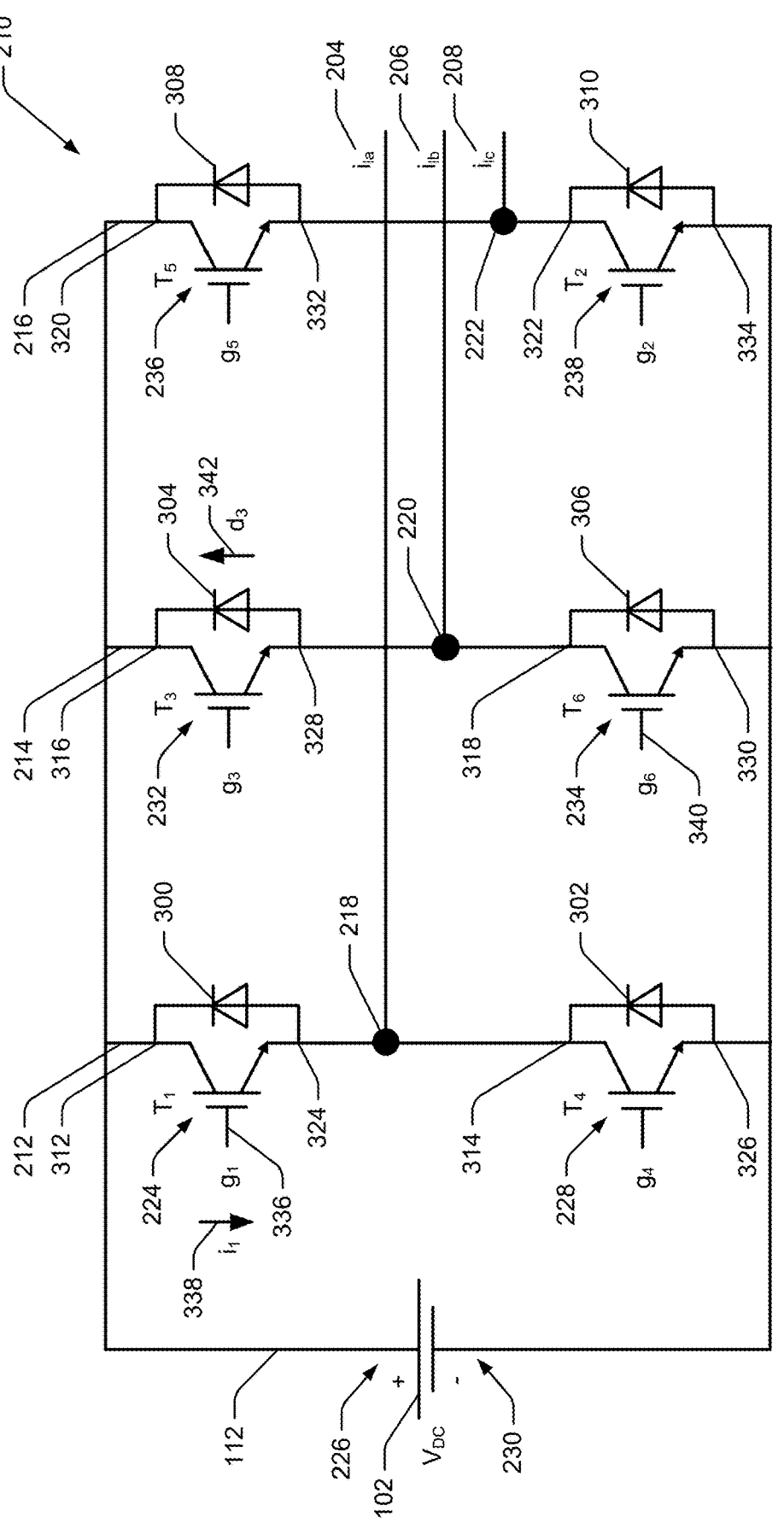
FIG. 3 is an enlarged schematic diagram of an array of transistors included in the converter of the grid-forming inverter of FIGS. 1 and 2.

Referring to FIG. 3, each of the transistors 224, 228, 232, 234, 236, and 238 of the inverter 210 incorporates a diode 300, 302, 304, 306, 308, and 310 coupled in a blocking configuration between a collector 312, 314, 316, 318, 320, and 322 and an emitter 324, 326, 328, 330, 332, and 334 of each of the transistors 224, 228, 232, 234, 236, and 238, respectively. In this configuration, an anode of each of the diodes 300, 302, 304, 306, 308, and 310 is coupled to the emitter and its cathode is coupled to the collector of its respective transistor 224, 228, 232, 234, 236, and 238, respectively. As a result, each of the diodes 300, 302, 304, 306, 308, and 310 opposes a flow of current around the respective transistors 224, 228, 232, 234, 236, and 238 from the collector 312, 314, 316, 318, 320, and 322 to the emitter 324, 326, 328, 330, 332, and 334, respectively. However, the diodes 300, 302, 304, 306, 308, and 310 permit a flow of current around the respective transistors 224, 228, 232, 234, 236, and 238 from the emitter 324, 326, 328, 330, 332, and 334 to the collector 312, 314, 316, 318, 320, and 322. Thus, as described further below, an excessive current detected across one or more of the transistors 224, 228, 232, 234, 236, and 238 may be redirected to the DC power source $V_{DC}$ 102 where it may be discharged rather than be permitted to flow across one or more of the transistors 224, 228, 232, 234, 236, and 238.

For example, when a gate $g_1$ 336 of the transistor $T_1$ 224 is enabled, a first current $i_1$ 338 applied at the collector 312 of the transistor $T_1$ 224 at the positive side 226 of the DC power source $V_{DC}$ 102 is permitted to flow through across the transistor $T_1$ 224 to the emitter 324 of the transistor $T_1$ 224. The current $i_1$ 338 is presented at the first output node 218 and also may flow across the transistor $T_4$ 228 (if a gate $g_4$ 340 is enabled). On the other hand, when the gate $g_1$ 336 is disabled, the first current $i_1$ 338 applied at the collector 312 of the transistor $T_1$ 224 at the positive side 226 of the DC power source $V_{DC}$ 102 is prevented from flowing through the transistor $T_1$ 224 to the emitter 324 of the transistor $T_1$ 224. Similarly, when the gate $g_4$ 340 is disabled, a current detected at the output node 218 applied at the collector 318 of the transistor $T_4$ 228 is prevented from flowing through the transistor $T_4$ 228 to the emitter 330 of the transistor $T_4$ 228. Controlling the flow of current through the transistor $T_1$ 224 and/or the transistor $T_4$ 228 (as well as through the transistors 232, 234, 236, and 238) is how the inverter 210, under control of the gate signals 116 generated by the pulse-width modulator 118 (FIG. 1), generates sinusoidal AC current at the output 104.

Although an IGBT transistor like $T_1$ 224 is rated to accommodate a large bipolar current flowing between the collector 312 and the emitter 324, the transistor $T_1$ 224 may nonetheless be damaged if the current $i_1$ 338 applied at a collector 312 exceeds a maximum transient current for which the transistor $T_1$ 224 is rated (i.e., the inverter-maximum transient output current $I_{maxF}$ 250). Accordingly, by disabling the gate $g_1$ 336, the current $i_1$ 338 is prevented from flowing through the transistor $T_1$ 224, protecting the transistor $T_1$ 224 from damage. Similarly, by disabling the gate $g_4$ 340, a current at the output node 220 is prevented from flowing through the transistor $T_4$ 234, protecting the transistor $T_4$ 234 from damage. Thus, in response to a current applied across one or more of the transistors 224, 228, 232, 234, 236, and 238, the instantaneous current-limiting subsystem 106 disables gates of the respective transistors 224, 228, 232, 234, 236, and 238 to prevent them from being damaged by a fault current in excess of the inverter-maximum transient output current $I_{maxF}$ 250 (FIG. 2).

In various aspects, when a fault current is detected by the instantaneous current-limiting subsystem 106, such as if the current $i_1$ 338 or another current detected at one of the output nodes 218, 220, and/or 222 is determined to be in excess of the inverter-maximum transient output current $I_{maxF}$ 250, the current may be redirected across DC power source $V_{DC}$ 102. For example, when a gate $g_4$ 342 of the transistor $T_4$ 234 is disabled, a current detected at the output node 220 cannot flow through the transistor $T_4$ 234, but it may flow across the diode 304, as a diode current $d_3$ 342 back to the positive side 226 of the DC power source $V_{DC}$ 102 where the current $d_3$ 342 may dissipate. This "fault current" may thus flow "backward" across the DC power source $V_{DC}$ 102 where it may flow from the negative side 230 of the DC power source $V_{DC}$ 102 through the diodes 300, 302, 304, 306, 308, and/or 310 one or more branches 212, 214, and 216 of the inverter 210 until the fault current is dissipated.

Thus, in response to detecting a fault current at one or more of the output nodes 218, 220, and/or 222, the instantaneous current-limiting subsystem 106 thus protects the transistors 224, 228, 232, 234, 236, and 238 by disabling gates of the respective transistors 224, 228, 232, 234, 236, and 238 to prevent the fault current from flowing through the respective transistors 224, 228, 232, 234, 236, and 238. The instantaneous current-limiting subsystem 106 disables the gates of the affected transistors by replacing the gate signals 116 generated by the pulse-width modulator 118 with the modified gate signals 110, as further described below. The fault current is discharged across the DC power source $V_{DC}$ 102 through one or more of the diodes 300, 302, 304, 306, 308, and/or 310. When gates of the respective transistors 224, 228, 232, 234, 236, and 238 are reenabled, if the fault current is again detected at one or more of the output nodes 218, 220, and 222, gates of the respective transistors 224, 228, 232, 234, 236, and 238 are again disabled. The sequence repeats until the fault current is no longer detected in one of the one or more currents $i_{Ia}$ 204, $i_{Ib}$ 206, and $i_{Ic}$ 208 presented at one or more of the output nodes 218, 220, and 222 as detected by the hysteresis loop 200, as further described below.

Figure 4:
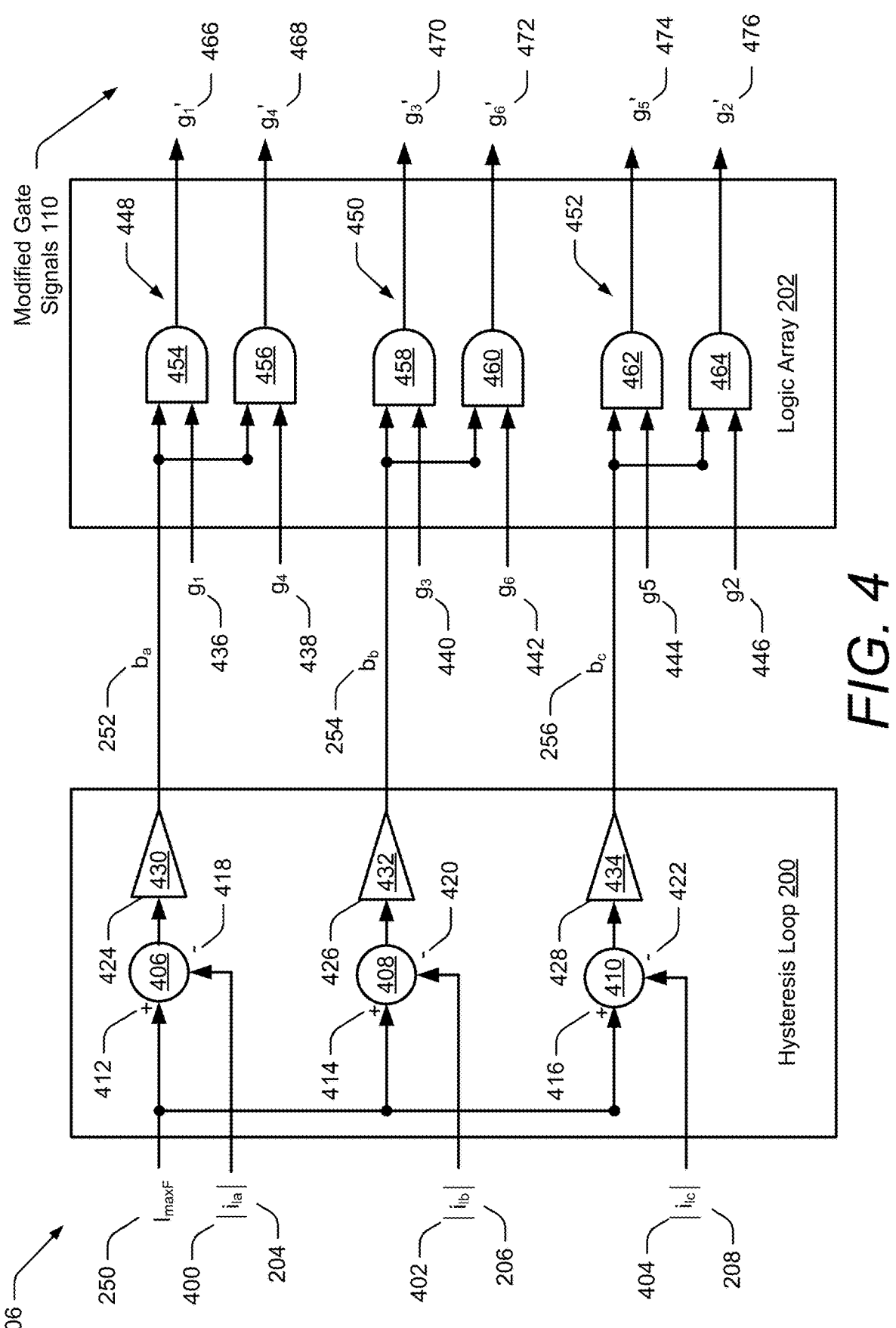
FIG. 4 is a schematic diagram of the instantaneous current-limiting subsystem of FIGS. 1 and 2 including a hysteresis loop and a logic array.

FIG. 4 details an example configuration of the hysteresis loop 200 and the logic array 202 included in the instantaneous current-limiting subsystem 106. The hysteresis loop 200 receives current magnitudes 400, 402, and 404 of the currents $i_{Ia}$ 204, $i_{Ib}$ 206, and $i_{Ic}$ 208, respectively, produced by the inverter 210 and the inverter-maximum transient output current $I_{maxF}$ 250. The respective current magnitudes 400, 402, and 404 and $I_{maxF}$ 250 are supplied to comparators 406, 408, and 410. Specifically, $I_{maxF}$ 250 is presented to positive inputs 412, 414, and 416 of the comparators 406, 408, and 410. The current magnitudes 400, 402, and 404 of the currents $i_{Ia}$ 204, $i_{Ib}$ 206, and $i_{Ic}$ 208 are presented to negative inputs 418, 420, and 422 of the comparators 406, 408, and 410, respectively. As long as $I_{maxF}$ 250 is greater than the respective current magnitudes 400, 402, or 404, outputs 424, 426, and 428 of the respective comparators 406, 408, and 410 will be a logical 1 or a high output. By contrast, when the respective current magnitudes 400, 402, or 404 are greater than $I_{maxF}$ 250 is greater than the outputs 424, 426, and 428 of the respective comparators 406, 408, and 410 will be a logical 0 or a low output. In various aspects, the outputs 424, 426, and 428 are presented to buffers 430, 432, and 434, respectively. Outputs of the buffers $b_a$ 252, $b_b$ 254, and $b_c$ 256 (FIG. 2) of the hysteresis loop 200 are termed "overcurrent signals" in that the outputs of the buffers $b_a$ 252, $b_b$ 254, and $b_c$ 256 will indicate when one of more of the currents $i_{Ia}$ 204, $i_{Ib}$ 206, and $i_{Ic}$ 208 includes a fault current in excess of the inverter-maximum transient output current $I_{maxF}$ 250.

The overcurrent signals $b_a$ 252, $b_b$ 254, and $b_c$ 256 are presented to the logic array 202 along with the gate signals 116 generated by the pulse-width modulator 118 (FIG. 1), $g_1$ 436, $g_4$ 438, $g_3$ 440, $g_6$ 442, $g_5$ 444, and $g_2$ 446. The logic array 202 includes three pairs of logic elements 448, 450, and 452. In this example, the pairs of logic elements 448, 450, and 452 include AND gates 454, 456, 458, 460, 462, and 464. At each of the AND gates 454, 456, 458, 460, 462, and 464, one of the overcurrent signals $b_a$ 252, $b_b$ 254, and $b_c$ 256 is logically combined with one of the gate signals $g_1$ 436, $g_4$ 438, $g_3$ 440, $g_6$ 442, $g_5$ 444, and $g_2$ 446.

Specifically, at a first pair of logic elements 448, the overcurrent signal $b_a$ 252 is logically combined at the AND gate 454 with the gate signal $g_1$ 436 to generate a modified gate signal $g_1$' 466 and the overcurrent signal $b_a$ 252 is logically combined at the AND gate 456 with the gate signal $g_4$ 438 to generate a modified gate signal $g_4$' 468. The gate signal $g_1$ 436 may be paired in the pair of logic elements 448 with the gate signal $g_4$ 438 to correspond to pairings of transistors $T_1$ 218 and $T_4$ 228 in the first branch 212 of the inverter 210 (FIGS. 2 and 3). Similarly, in a second pair of logic elements 450, the overcurrent signal $b_b$ 254 is logically combined at the AND gate 458 with the gate signal $g_3$ 440 to generate a modified gate signal $g_3$' 470 and the overcurrent signal $b_b$ 254 is logically combined at the AND gate 460 with the gate signal $g_6$ 442 to generate a modified gate signal $g_6$' 472. In a third pair of logic elements 452, the overcurrent signal $b_c$ 256 is logically combined at the AND gate 462 with the gate signal $g_5$ 444 to generate a modified gate signal $g_5$' 474 and the overcurrent signal be 256 is logically combined at the AND gate 464 with the gate signal $g_2$ 446 to generate a modified gate signal $g_2$' 476.

The logic array 202 thus is responsive to the hysteresis loop 200 to disable gates of transistors with a gate disable signal where a fault current has been detected across the respective transistor. For example, when current $i_{Ia}$ 204 is identified by the comparator 406 of the hysteresis loop 200 as a fault current because the magnitude 400 of the current $i_{Ia}$ 204 exceeds the inverter-maximum transient output current $I_{maxF}$ 250, the overcurrent signal $b_a$ 252 includes a fault signal, which is a logical 0 or low signal. When combined with the gate signals $g_1$ 436 and $g_4$ 438 at the pair of logic elements 448 including AND gates 454 and 456, the modified gate signals $g_1$' 466 and $g_4$' 468 replace the gate signals $g_1$ 436 and $g_4$ 438 with logical 0 or low gate disable signals to disable gates $g_1$ 336 and $g_4$ 340 of the transistors $T_1$ 224 and $T_4$ 228, respectively. Thus, regardless of the state of the gate signals $g_1$ 436 and $g_4$ 438 presented by the pulse-width modulator 118, the instantaneous current-limiting subsystem 106 will replace gate signals $g_1$ 436 and $g_4$ 438 with gate disable signals to disable the gates $g_1$ 336 and $g_4$ 340 of the transistors $T_1$ 224 and $T_4$ 228, respectively. The instantaneous current-limiting subsystem 106 thus may prevent the fault current from flowing through—and potentially, damaging—the transistors $T_1$ 224 and $T_4$ 228, and similarly protect other transistors $T_3$ 232, $T_6$ 234, $T_5$ 236, and $T_2$ 238 of the inverter 210.

Figure 5A:
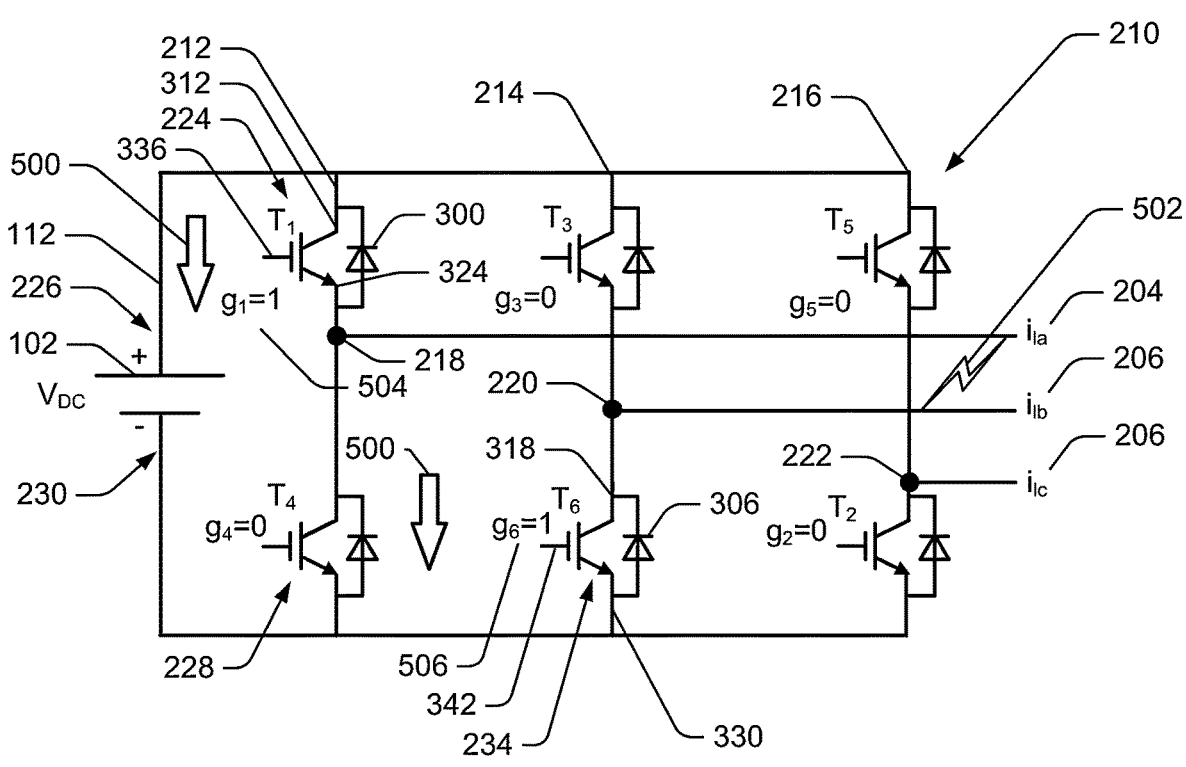
FIG. 5A is a schematic diagram of the transistors of FIG. 3 in an overcurrent situation without engagement of the instantaneous current-limiting subsystem of FIGS. 1 and 4.
Figure 5B:
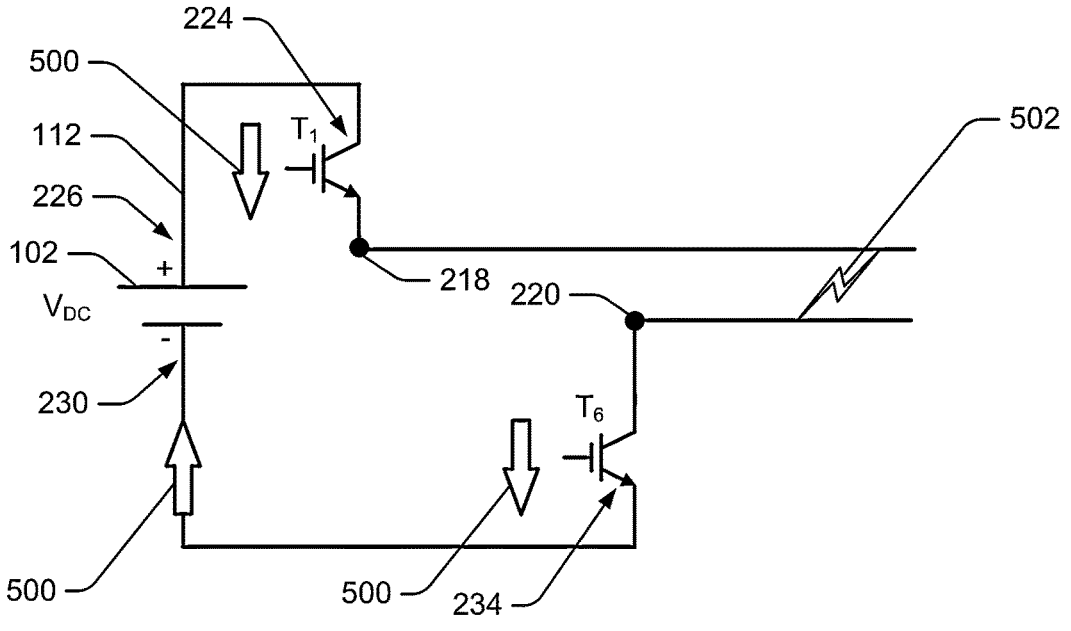
FIG. 5B is a partial schematic diagram of the converter of FIG. 5A depicting an effect of the overcurrent situation depicted in FIG. 5A.
Figure 6A:
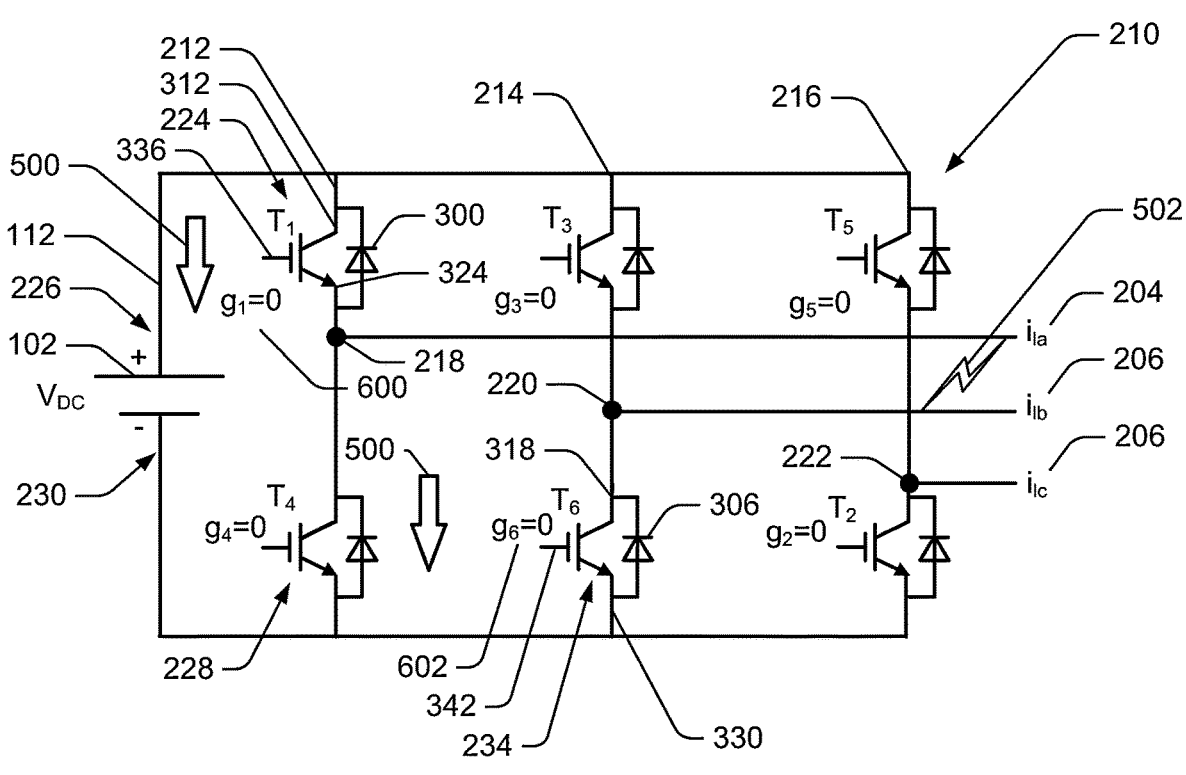
FIG. 6A is a schematic diagram of the transistors of FIG. 3 in an overcurrent situation with the instantaneous current-limiting subsystem of FIGS. 1 and 4 engaged to respond to the overcurrent situation.
Figure 6B:
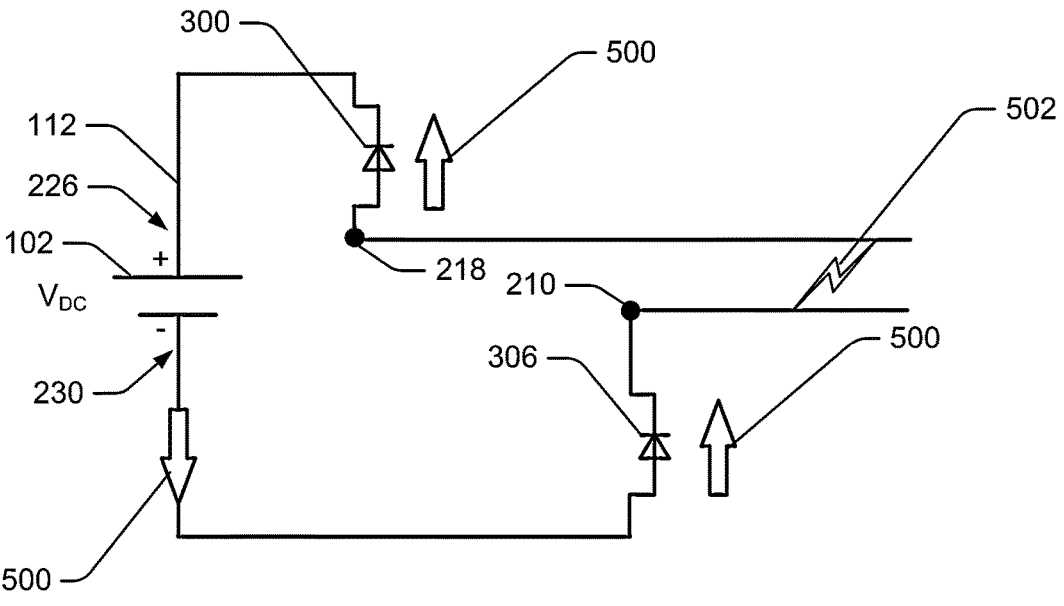
FIG. 6B is a partial schematic diagram of the inverter of FIG. 6A depicting the response of the instantaneous current-limiting subsystem of FIGS. 1 and 4 to the overcurrent situation.

FIGS. 5A-6B illustrate an example of how implementations of the instantaneous current-limiting subsystem 106 may redirect a fault current 500 detected at output node 218 to avoid damage to transistors $T_1$ 224 and $T_4$ 228. Fault currents detected at output nodes 220 and 222 also may be redirected to avoid damage to transistors $T_3$ 232, $T_6$ 234, $T_5$ 236, and $T_2$ 238 in a similar way. In the example of FIGS. 5A-6B, the fault current 500 is a result of a short circuit 502 between output nodes 218 and 220, although this is just one example of a cause of a fault current. FIGS. 5A and 5B illustrate a case in which the instantaneous current-limiting subsystem 106 is not engaged with the inverter 210 to respond to the fault current 500. FIGS. 6A and 6B illustrate a case in which the instantaneous current-limiting subsystem 106 is engaged with the inverter 210 to respond to the fault current 500.

Referring to FIG. 5A, for the sake of illustration, at the time the short circuit 502 causes the fault current 500 to be presented, the gate signals 116 presented by the pulse-width modulator 164 (not shown in FIGS. 5A-6B) include an active gate signal $g_1$=1 504 to enable the gate $g_1$ 336 of transistor $T_1$ 224 to conduct current between the collector 312 and the emitter 324 and an active gate signal $g_6$=1 506 to enable a gate $g_6$ 342 of transistor $T_6$ 234 to conduct current between the collector 318 and the emitter 330. As a result, referring to FIG. 5B, the fault current 500 flows through the short circuit 502 through the transistors $T_1$ 224 and $T_6$ 234. The fault current 500, being in excess of the inverter-maximum transient output current $I_{maxF}$ 250 for the transistors $T_1$ 224 and $T_6$ 234, may potentially damage the transistors $T_1$ 224 and $T_6$ 234 and thus damage the inverter 210.

However, the instantaneous current-limiting subsystem 106 may prevent the short circuit 502 from causing damage to the transistors $T_1$ 224 and $T_6$ 234. Referring to FIG. 6A, responsive to detecting the fault current 500 across the transistors $T_1$ 224 and $T_6$ 234, the instantaneous current-limiting subsystem 106 replaces the active gate signals $g_1=1$ 504 and $g_6=1$ 506 of the transistors $T_1$ 224 and $T_6$ 234 with gate disable signals $g_1=0$ 600 and $g_6=0$ 602, respectively. As a result, the fault current 500 is no longer conducted through the transistors $T_1$ 224 and $T_6$ 234. Instead, as shown in FIG. 6B, the fault current 500 flows through the diodes 300 and 306 across the transistors 224 and 234 between the emitters 324 and 330 of the transistors 224 and 234 and the collectors 312 and 318 of the transistors $T_1$ 224 and $T_6$ 234, respectively. Instead of the fault current 500 flowing through—and potentially damaging—the transistors $T_1$ 224 and $T_6$ 234, the fault current 500 is redirected through the diodes 300 and 306 to flow back across the DC power source $V_{DC}$ 102 where it is dissipated.

Figures 7, 8:
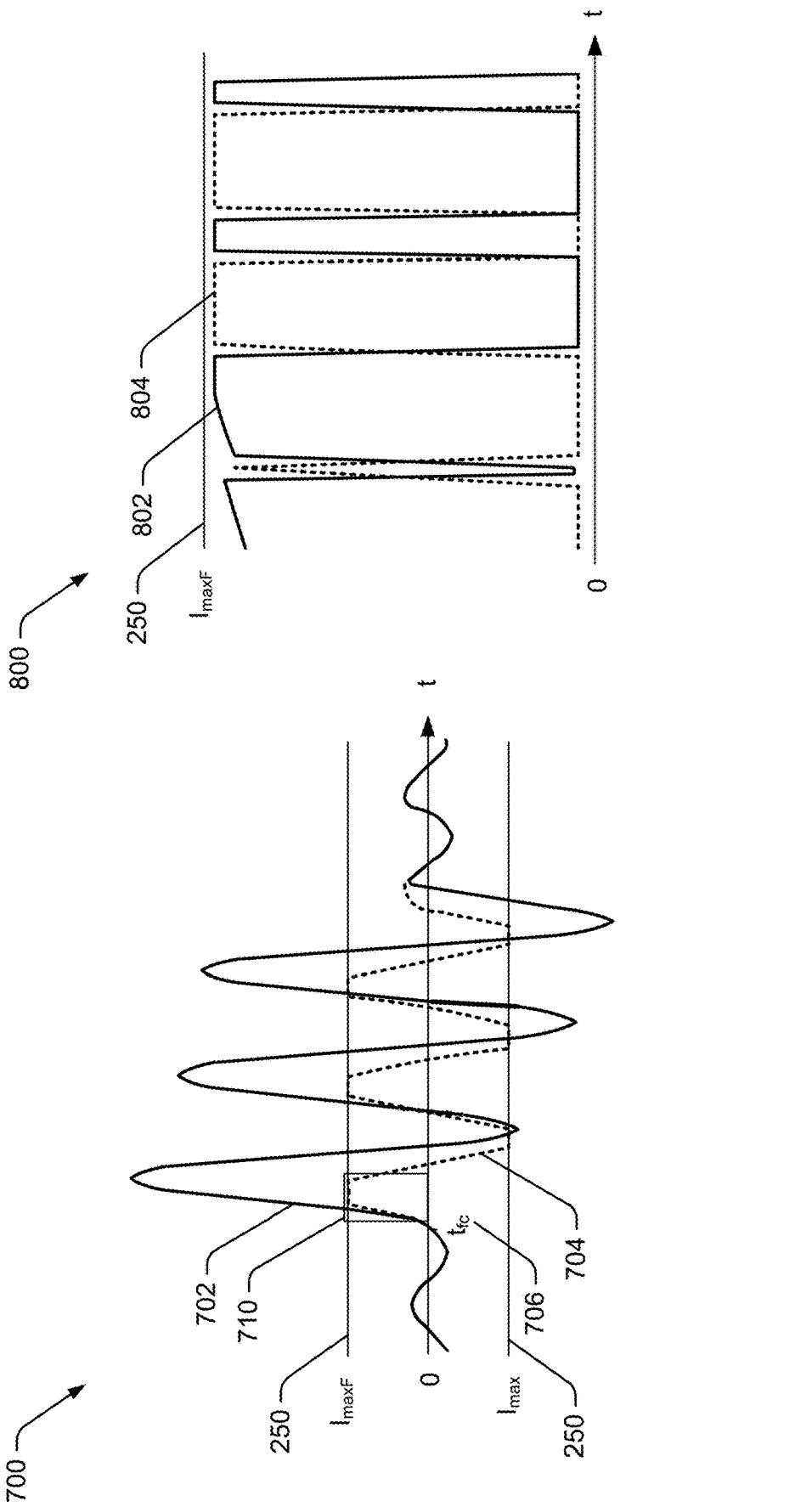
FIG. 7 is a composite graph of an output current in an overcurrent situation in the grid-forming inverter of FIGS. 1 and 2 with and without intervention of the instantaneous current-limiting subsystem of FIGS. 1 and 4.
FIG. 8 is a graph of the output current in the overcurrent situation depicted in FIG. 7 depicting an effect of the instantaneous current-limiting subsystem redirecting the output current.

FIG. 7 is a graph 700 comparing a plot of a current 702 detected across a plurality of transistors in an overcurrent situation with a plot of a modified current 704 constrained by the instantaneous current-limiting subsystem 106. At a time $t_f$ 706, the current 702 exceeds the inverter-maximum transient output current $I_{maxF}$ 250 at numerous points and, thus, is determined to be a fault current. By contrast, the modified current 704 is contained within a range bounded by the inverter-maximum transient output current $I_{maxF}$ 250 by the instantaneous current-limiting subsystem 106. As previously described, when the instantaneous current-limiting subsystem 106 detects a current that exceeds the inverter-maximum transient output current $I_{maxF}$ 250, the current-limiting subsystem 106 changes one or more gate signals to prevent the flow of current through one or more of the transistors and to redirect the excessive, fault current back across the DC power source $V_{DC}$ 102 (see FIGS. 6A and 6B) until the fault current is dissipated. Thus, the instantaneous current-limiting subsystem 106 prevents the current 702 from flowing through the transistors and other components when the current 702 exceeds the inverter-maximum transient output current $I_{maxF}$ 250 and, thus, may prevent damage to components through which an excessive current might otherwise flow.

FIG. 8 is a graph 800 of an enlarged region 710 (FIG. 7) of the plot of current 702. As previously described, upon detecting a current in excess of the inverter-maximum transient output current $I_{maxF}$ 250, the instantaneous current-limiting subsystem 106 disables gates of one or more transistors through which the fault current would flow and redirects the fault current back across the DC power source $V_{DC}$ 102. Thus, a plot of current 802 flowing through the one or more affected transistors is cut off at or around a level of the inverter-maximum transient output current $I_{maxF}$ 250. Then, as described with reference to FIGS. 6A and 6B, a redirected current 804, redirected through one or more diodes such as diodes 300 and 306, may circulate back across the DC power source $V_{DC}$ 102. If the redirected current 804 results in an output current across one or more of the transistors that exceeds the inverter-maximum transient output current $I_{maxF}$ 250, that current also will be constrained by disabling the transistors through which the redirected current 804 flows until the redirected current dissipates. Thus, by disabling transistors across which a fault current is applied to redirect the fault current, then by continuing to rapidly enable and disable other transistors in response to whether the fault current is detected across the respective transistors, the instantaneous current-limiting subsystem 106 repeatedly redirects the fault current across the DC power source $V_{DC}$ 102 until the fault current is dissipated.

Example Method of Instantaneous Current Limiting

FIG. 9 is a flow diagram of an example method 900 for limiting current across one or more transistors in a grid-forming inverter controlled by a single-loop droop controller as previously described with reference to FIGS. 1-8. At a block 902, a plurality of gate signals are generated, the gate signals being applicable to a plurality of transistors in the grid-forming inverter to cause the grid-forming inverter to generate a plurality of output currents combinable to form an alternating current. As described with reference to FIG. 2, a pulse-width modulator 118 may be used to generate gate signals configured to enable the plurality of transistors to generate DC currents that may be combined to form a sinusoidal AC current. At block 904, an inverter-maximum transient output current ($I_{maxF}$ 250) is compared with the plurality of output currents to generate an overcurrent signal. The overcurrent signal presents a fault signal responsive to one of the plurality of output currents $i_{Ia}$ 204, $i_{Ib}$ 206, and $i_{Ic}$ 208, flowing through at least one of the transistors 224, 228, 232, 234, 236, and/or 238 and detectable at one of the output nodes 218, 220, and 222, exceeding the inverter-maximum transient output current $I_{maxF}$ 250. At block 906, upon the fault signal being presented, one or more of the gate signals 116 is replaced with one or more a modified gate signals to disable a gate of one or more of the plurality of transistors. At a block 908, the one or more modified gate signals are applied to the at least one of the transistors 224, 228, 232, 234, 236, and/or 238 to prevent the output currents $i_{Ia}$ 204, $i_{Ib}$ 206, and $i_{Ic}$ 208 from flowing through the at least one of the transistors 224, 228, 232, 234, 236, and/or 238.

Example of an Active and Reactive Current-Limiting Subsystem

Figure 10:
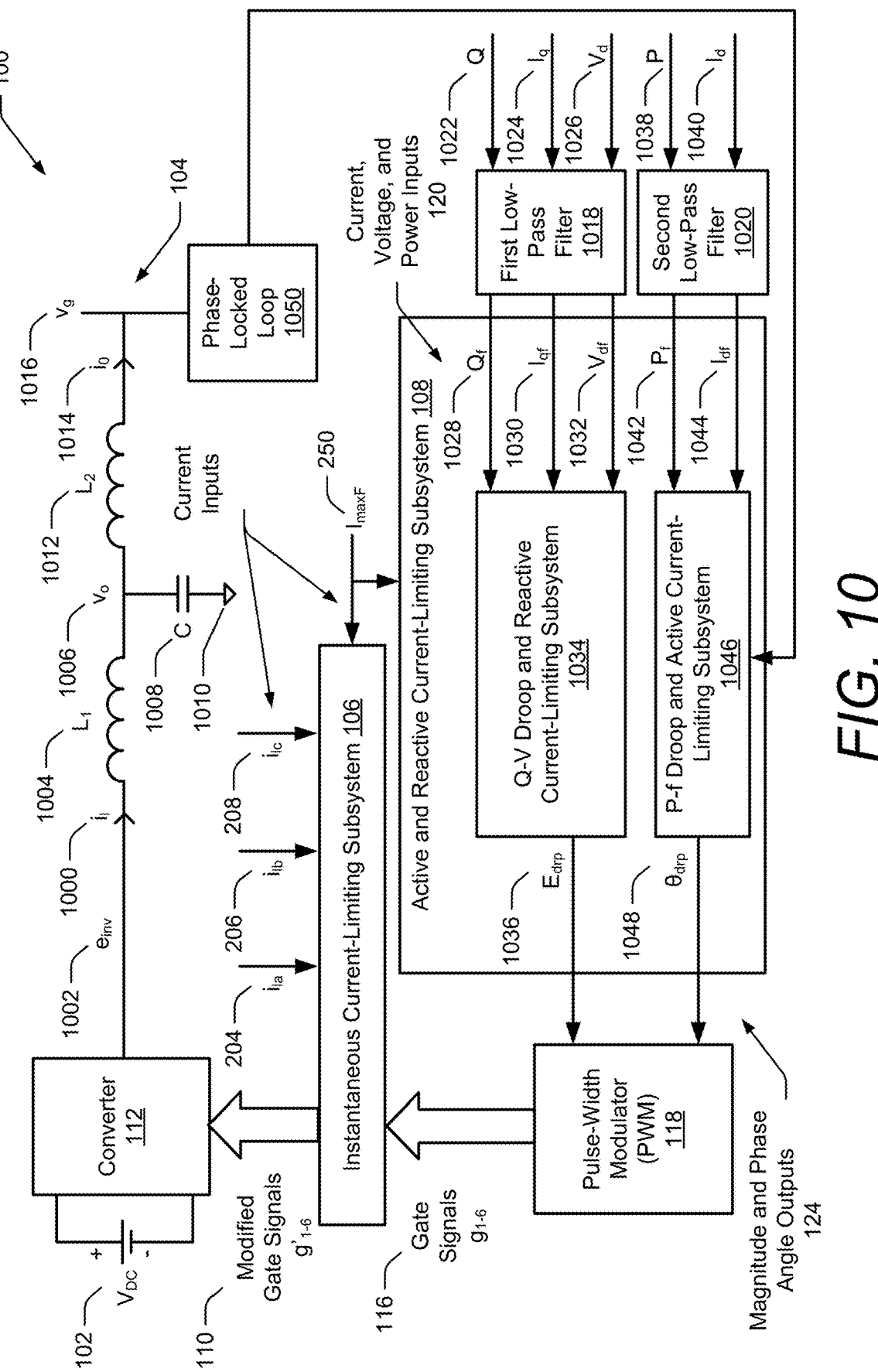
FIG. 10 is a schematic diagram of the grid-forming inverter of FIG. 1 including an embodiment of an active and reactive current-limiting subsystem.

FIG. 10 is a schematic diagram of the single-loop droop-controlled grid-forming inverter 100 of FIG. 1 expanding on details of the active and reactive current-limiting subsystem 108 and related aspects of the grid-forming inverter 100. The active and reactive current-limiting subsystem 108, as previously described, adjusts the output 104 of the grid-forming inverter 100 to synchronize the output 104 with the grid (not shown) with which the grid-forming inverter 100 is coupled. It thus may be desirable to include both the instantaneous current-limiting subsystem 106 to prevent the transistors 224, 228, 232, 234, 236, and/or 238 (FIG. 1) included in the converter 112 from being damaged as a result of a fault situation, as previously described, and the active and reactive current-limiting subsystem 108 to synchronize the grid-forming inverter 100 with the grid subsequent to such a fault. It will be appreciated that the instantaneous current-limiting subsystem 106, in redirecting fault currents that would ordinarily contribute to the alternating-current waveform generated by the converter 112, may disrupt the output 104 of the grid-forming inverter 100. Including the active and reactive current-limiting subsystem 108 may then correct for these and other disruptions in the output 104 of the grid-forming inverter 100.

By way of context, in generating the output 104, the converter 112, which includes a bridge rectifier comprised of the transistors 224, 228, 232, 234, 236, and/or 238 generates a bridge-side inverter output current $i_o$ 1000 at bridge-side inverter voltage $e_{inv}$ 1002. After passing through an inverter bridge-side filter inductance $L_1$ 1004, a filter capacitance voltage $v_o$ 1006 is applied at an inverter filter capacitor C 1008 that is coupled to ground 1010 and to an inverter grid-side filter inductance $L_2$ 1012. An output of the inverter grid-side filter inductance $L_2$ 1012 is an inverter output grid-side current 1014 presented to the grid (not shown) at the output 104 at a grid voltage $v_g$ 1016.

From the output 104 of the grid-forming inverter 100, various aspects of the current, voltage, and power at the output 104 are applied to low-pass filters 1018 and 1020 to generate the feedback inputs 120 used by the active and reactive current-limiting subsystem 108. Specifically, a measured reactive power Q 1022, an inverter bridge-side current q component $I_q$ 1024 (derived from a coordinate transformation described with reference to FIG. 11), and a grid-voltage d component $V_d$ 1026 (also derived from a coordinate transformation described with reference to FIG. 11) are applied to a first low-pass filter 1018 that is included to filter out line noise. Outputs of the first low-pass filter 1018 include a portion of the feedback inputs 120 (FIG. 1) to the active and reactive current-limiting subsystem 108, including a filtered reactive power $Q_f$ 1028, a filtered inverter bridge-side current q component $I_{qf}$ 1030, and a filtered grid-voltage d component $V_{df}$ 1032. The filtered inputs 1028, 1030, and 1032 are presented to a Q-V (reactive power) droop and reactive current-limiting subsystem 1034 that will generate $E_{drp}$ 1036, the magnitude of the droop controller modulation waveform presented to the pulse-width modulator 118.

A measured active power P 1038 and an inverter bridge-side current d component $I_d$ 1040 (derived from a coordinate transformation described with reference to FIG. 11) are applied to a second low-pass filter 1020 that, like the first low-pass filter 1018, is included to filter out line noise. Outputs of the second low-pass filter 1020 include the other portion of the feedback inputs 120 (FIG. 1) to the active and reactive current-limiting subsystem 108, including a filtered measured active power $P_f$ 1042 and a filtered inverter bridge-side current direct current component (filtered direct current component) $I_{df}$ 1044. The filtered measured active power $P_f$ 1042 and the filtered direct current component $I_{df}$ 1044 are presented to a P-f (active power) droop and active current-limiting subsystem 1046 that will generate $\theta_{drp}$ 1048, the rotating phase angle of the droop-controller modulation waveform presented to the pulse-width modulator 118. In addition, a phase-locked loop 1050 may be included in the grid-forming inverter 100 to measure a phase angle of the grid voltage at the output 104 of the grid-forming inverter 100. As described below, an output of the phase-locked loop 1050 is used by the P-f droop and active current-limiting subsystem 1046 to generate $\theta_{drp}$ 1048, the phase angle of the droop-controller modulation waveform presented to the pulse-width modulator 118.

Figure 11:
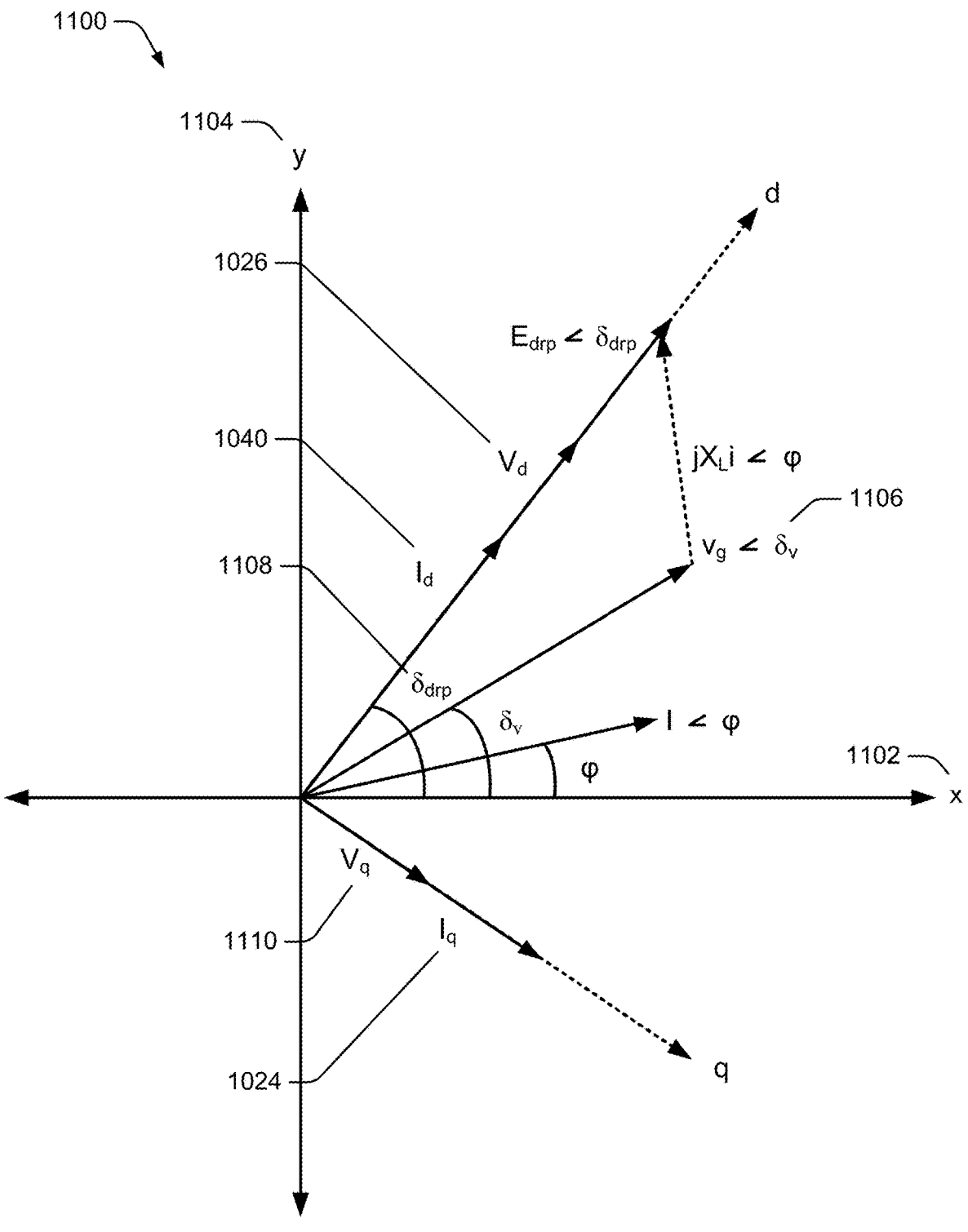
FIG. 11 is a phasor diagram depicting transformation of current and voltage signals into direct and quadrature components used by the active and reactive current-limiting subsystem of FIG. 10.

FIG. 11 is a phasor diagram 1100 depicting a transform used by the Q-V droop and reactive current-limiting subsystem 1034 and the P-f droop and active current-limiting subsystem 1046 to generate the magnitude $E_{drp}$ 1036 and phase angle $\theta_{drp}$ 1048. The magnitude $E_{drp}$ 1036 and phase angle $\theta_{drp}$ 1048 direct the pulse-width modulator 118 in generating the gate signals 116 to cause the converter 112 to generate an AC sinusoidal output (subject to modifications applied by the instantaneous current-limiting subsystem 106 as described above). The magnitude $E_{drp}$ 1036 and phase angle $\theta_{drp}$ 1048 may be determined using a Park Transform to convert components in a coordinate frame of reference to direct and quadrature (d-q) components in an orthogonal rotating frame of reference. Specifically, the phasor diagram 1100 shows measured values mapped in an x-y coordinate space defined by an x-axis 1102 and a y-axis 1104 and transformable into a direct and quadrature (d-q) rotating frame of reference to yield inputs for the active and reactive current-limiting subsystem 108, such as $V_d$ 1026, $I_d$ 1040, $I_q$ 1024, are derivable from the equations below. Other values, such as those used by the phase-locked loop 1050, such as $V_g \angle \delta_{drp}$ 1106, also are derivable from the Park Transform.

The phase angle $\theta_{drp}$ 1048 may be derived from terms derivable from the transform using the expression given in Eq. (1). The value $\delta_{drp}$ 1108 is the phase angle for the droop controller in the dq coordinate transform. $\omega_0$ is rated angular frequency and t is time:

$$\theta_{drp} = \delta_{drp} + \omega_o t \tag{1}$$

The values of $I_q$ 1024 and $I_d$ 1040 may be derived from $\delta_{drp}$ 1108 and bridge-side inverter output currents the currents $i_{Ia}$ 204, $i_{Ib}$ 206, and $i_{Ic}$ 208 using Eq. (2):

$$\begin{bmatrix} I_d \\ I_q \end{bmatrix} = \frac{2}{3} \begin{bmatrix} \cos(\delta_{drp}) & \cos\left(\delta_{drp} - \frac{2}{3}\pi\right) & \cos\left(\delta_{drp} + \frac{2}{3}\pi\right) \\ \sin(\delta_{drp}) & \sin\left(\delta_{drp} - \frac{2}{3}\pi\right) & \sin\left(\delta_{drp} + \frac{2}{3}\pi\right) \end{bmatrix} \begin{bmatrix} i_{Ia} \\ i_{Ib} \\ i_{Ic} \end{bmatrix} \tag{2}$$

The values of $V_d$ 1026 and $V_q$ 1110 (FIG. 11) similarly may be derived from $\delta_{drp}$ 1108 and bridge-side inverter output currents the currents $i_{Ia}$ 204, $i_{Ib}$ 206, and $i_{Ic}$ 208 using Eq. (3):

$$\begin{bmatrix} V_d \\ V_q \end{bmatrix} = \frac{2}{3} \begin{bmatrix} \cos(\delta_{drp}) & \cos\left(\delta_{drp} - \frac{2}{3}\pi\right) & \cos\left(\delta_{drp} + \frac{2}{3}\pi\right) \\ \sin(\delta_{drp}) & \sin\left(\delta_{drp} - \frac{2}{3}\pi\right) & \sin\left(\delta_{drp} + \frac{2}{3}\pi\right) \end{bmatrix} \begin{bmatrix} v_{ga} \\ v_{gb} \\ v_{gc} \end{bmatrix} \tag{3}$$

Other values presented to the active and reactive current-limiting subsystem 108, including $Q_f$ 1028, $I_{qf}$ 1030, $V_{df}$ 1032, $P_f$ 1042, and $I_{df}$ 1044 are derived through low-pass filtering by the low-pass filters 1018 and 1020 from other measurable or derived values described herein according to Eqs. (4)-(9) where $T_f$ is the time constant of the low-pass filters 1018 and 1020:

$$I_{df} = \frac{1}{1 + T_f s} I_d \tag{4}$$

$$I_{qf} = \frac{1}{1 + T_f s} I_q \tag{5}$$

$$V_{df} = \frac{1}{1 + T_f s} V_d \tag{6}$$

$$V_{qf} = \frac{1}{1 + T_f s} V_q \tag{7}$$

$$P_f = \frac{1}{1 + T_f s} P \tag{8}$$

$$Q_f = \frac{1}{1 + T_f s} Q \tag{9}$$

Figure 12:
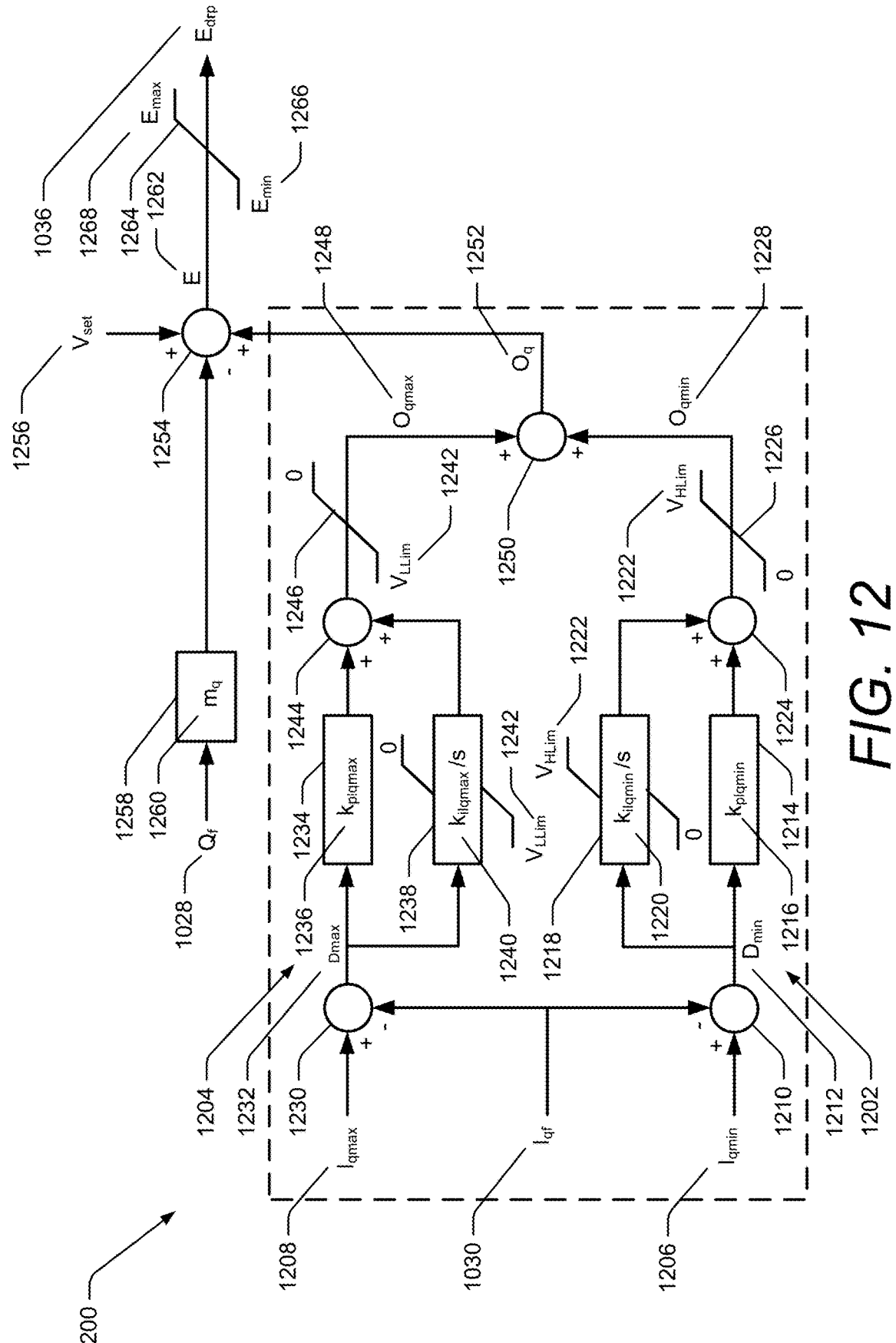
FIG. 12 is a block diagram of an implementation of a reactive current-limiting subsystem.
Figure 13:
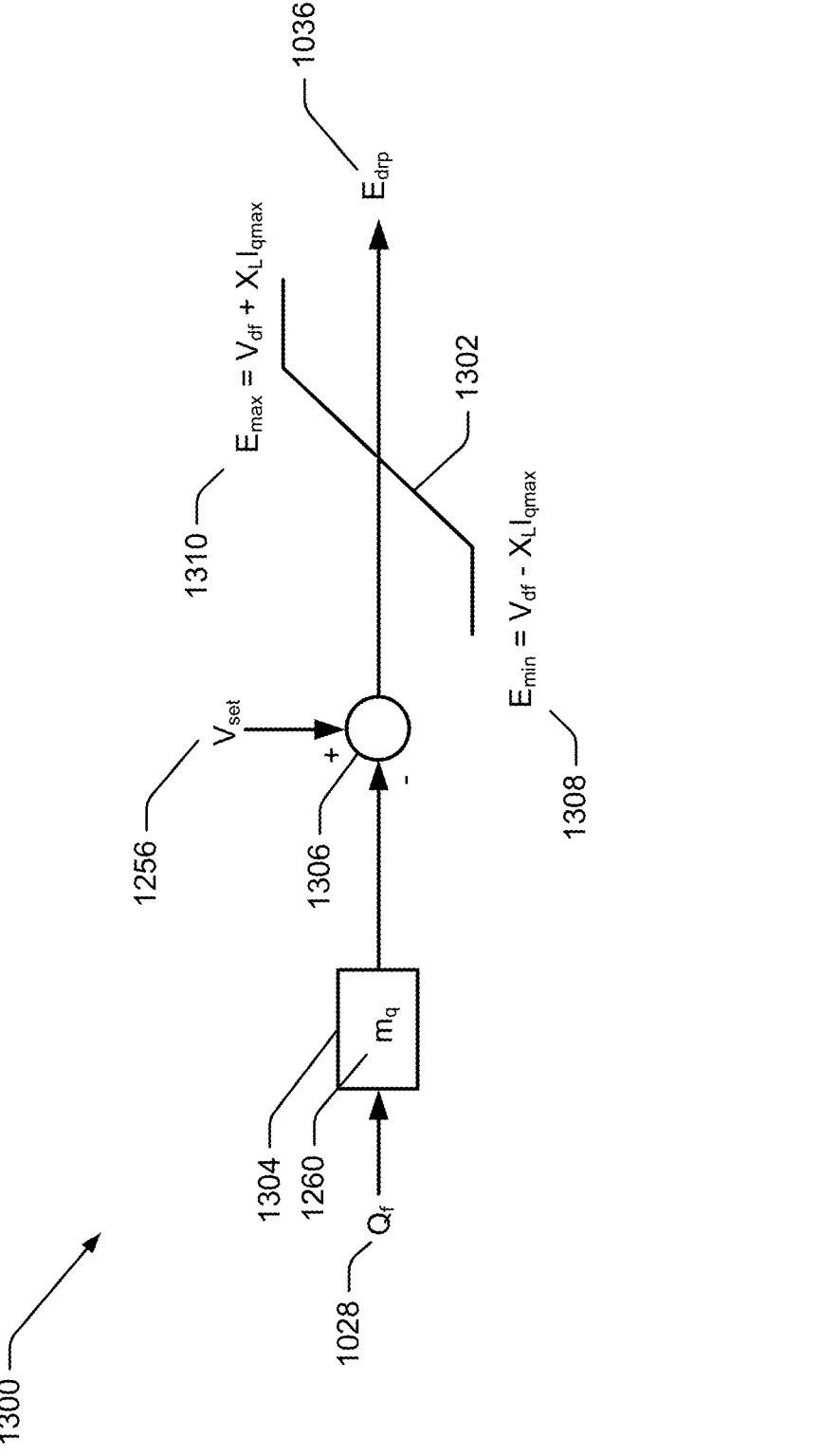
FIG. 13 is a block diagram of another implementation of a reactive current-limiting subsystem.

The reactive current-limiting subsystem 1034, as previously described, receives the filtered reactive power $Q_f$ 1028, a filtered inverter bridge-side current q component $I_{qf}$ 1030, and a filtered grid-voltage d component $V_{df}$ 1032 as derived according to Eqs. (9), (5), and (6), respectively. From these values, $E_{drp}$ 1036, the magnitude of the droop controller modulation waveform presented to the pulse-width modulator 118, is generated. FIGS. 12 and 13 illustrate two examples of alternative implementations of the reactive current-limiting subsystem 1034 that may be used to regulate $I_{qf}$ 1030, the reactive current, particularly during long-lasting low-voltage events.

Implementations of a Reactive Current-Limiting Subsystem

FIG. 12 depicts an implementation of a reactive current-limiting subsystem 1200 that may be used as the reactive current-limiting subsystem 1034 in the grid-forming inverter 100. The reactive current-limiting subsystem 1200 is based principally on a pair of proportional-integral (P-I) controllers, an $I_{qmin}$ limiting controller 1202 and an $I_{qmax}$ limiting controller 1204. The reactive current-limiting subsystem 1200 may be implemented in a programmable control unit or an application-specific control device. In addition to receiving the filtered reactive power $Q_f$ 1028 as an input, as shown in FIG. 10 the reactive current-limiting subsystem 1200 receives $I_{qmin}$ 1206 and $I_{qmax}$ 1208, the lower and upper limits of the filtered reactive current $I_{qf}$ 1030, respectively. These values may be set during configuration of the reactive current-limiting subsystem 1200. Using the reactive current-limiting subsystem 1200, in general, once the inverter-filtered reactive current $I_{qf}$ 1030 drops below $I_{qmin}$ 1206 or exceeds $I_{qmax}$ 1208, the reactive current-limiting subsystem 1200 acts to reduce or increase the magnitude of the modulation waveform $E_{drp}$ 1036.

Specifically, in the $I_{qmin}$ limiting controller 1202, the reactive current $I_{qf}$ 1030 is applied to a negative input of a summing point 1210 at which $I_{qmin}$ 1206 is applied to a positive input of the summing point 1210 to determine a difference $D_{min}$ 1212. A proportional component 1214 applies $k_{qpImin}$ 1216, a proportional gain of the $I_{qmin}$ limiting controller 1202, to $D_{min}$ 1212. An integral component 1218 sums $D_{min}$ 1212 subject to $k_{iIqmin}$ 1220, an integral gain of the $I_{qmin}$ limiting controller 1202, up to $V_{HLim}$ 1222, an upper limit of the limiting controllers 1202 and 1204. Outputs of the proportional component 1214 and the integral component 1218 are combined at a summing point 1224 and summed at an integral component 1226 up to $V_{HLim}$ 1222 to yield an output of the $I_{qmin}$ limiting controller 1202, $O_{gmin}$ 1228.

In the $I_{qmax}$ limiting controller 1204, the reactive current $I_{qf}$ 1030 is applied to a negative input of a summing point 1230 at which $I_{qmax}$ 1208 is applied to a positive input of the summing point 1230 to determine a difference $D_{max}$ 1232. A proportional component 1234 applies $k_{qpImax}$ 1236, a proportional gain of the $I_{qmax}$ limiting controller 1204, to $D_{max}$ 1232. An integral component 1238 sums $D_{max}$ 1232 subject to $k_{iIqmax}$ 1240, an integral gain of the $I_{qmax}$ limiting controller 1204, from to $V_{LLim}$ 1242, a lower limit of the limiting controllers 1202 and 1204. Outputs of the proportional component 1234 and the integral component 1238 are combined at a summing point 1244 and summed at an integral component 1246 from $V_{LLim}$ 1242 to yield an output of the $I_{qmax}$ limiting controller 1204, $O_{qmax}$ 1248.

The outputs $O_{qmin}$ 1228 and $O_{qmax}$ 1248 are combined at a summing point 1250 to yield an output $O_q$ 1252. $O_q$ 1252 is combined at a summing point 1254 with $V_{set}$ 1256, a voltage setpoint for the reactive current-limiting subsystem 1200 and negatively combined with an output of a proportional component 1258 where $m_q$ 1260, a selected Q-V droop gain, is applied to the filtered reactive power $Q_f$ 1028. The output of the summing point 1254 is a magnitude E 1262, which is summed at an integral component 1264 from $E_{min}$ 1266, a transient lower limit of $E_{drp}$ 1036, the magnitude of the droop controller modulation waveform, to $E_{max}$ 1268, a transient upper limit of $E_{drp}$ 1036, to yield $E_{drp}$ 1036, the output of the reactive current-limiting subsystem 108 of FIG. 10.

As an alternative to the implementation of FIG. 12 using a reactive current-limiting subsystem 1200 based principally on the pair of proportional-integral (P-I) controllers 1202 and 1204 used to regulate the reactive current $I_{qf}$ 1030, FIG. 13 depicts another implementation of a reactive current-limiting subsystem 1300 that may be used as the reactive current-limiting subsystem 108 in the grid-forming inverter 100. The reactive current-limiting subsystem 1300 is principally based on an integral component 1302. At a proportional component 1304, $m_q$ 1260, the selected Q-V droop gain, is applied to the filtered reactive power $Q_f$ 1028. The output of the proportional component 1304 is subtracted at a summing point 1306 from $V_{set}$ 1256, the voltage setpoint for the reactive current-limiting subsystem 1300. An output of the summing point 1306 is summed by the integral component 1302 from $E_{min}$ 1308, which is equal to the difference of the filtered grid-voltage d component $V_{df}$ 1032 (FIG. 10) less a product of the total inverter coupling reactance $X_L$, and $I_{qmax}$ 1208, the upper limit of the filtered reactive current $I_{qf}$ 1030, to $E_{max}$ 1310, which is equal to the sum of $V_{df}$ 1032 (FIG. 10) and the product of $X_L$ and $I_{qmax}$ 1208. The output of the integral component 1302 is $E_{drp}$ 1036, the output of the reactive current-limiting subsystem 108 of FIG. 10.

Implementation of an Active Current-Limiting Subsystem

Figure 14:
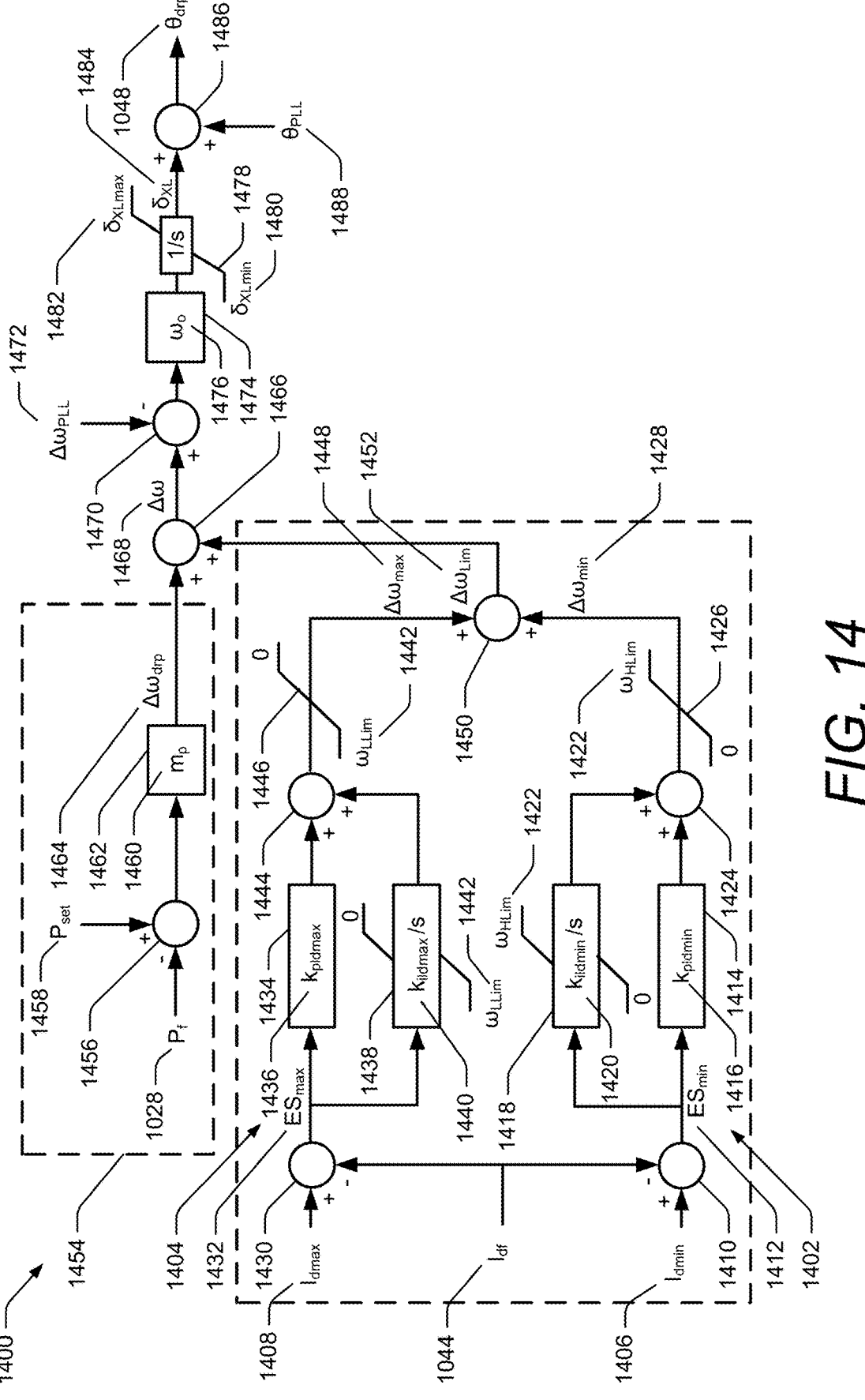
FIG. 14 is a block diagram of an implementation of an active current-limiting subsystem.

FIG. 14 depicts an implementation of an active current-limiting subsystem 1400 that may be used as the P-f droop and active current-limiting subsystem 1046 in the grid-forming inverter 100. The active current-limiting subsystem 1400 is based principally on a pair of proportional-integral (P-I) controllers, an $I_{dmin}$ limiting controller 1402 and an $I_{dmax}$ limiting controller 1404. The active current-limiting subsystem 1400, like the reactive current-limiting subsystems 1300 and 1400, may be implemented in a programmable control unit or an application-specific control device. In addition to receiving the filtered measured active power $P_f$ 1028 as an input, as shown in FIG. 10, the active current-limiting subsystem 1400 receives $I_{dmin}$ 1406 and $I_{dmax}$ 1408, the lower and upper limits of the filtered direct current component $I_{df}$ 1044, respectively. These values may be set during configuration of the active current-limiting subsystem 1400. Using the active current-limiting subsystem 1400, in general, once the filtered direct current component $I_{df}$ 1044 drops below $I_{dmin}$ 1406 or exceeds $I_{dmax}$ 1408, the reactive current-limiting subsystem 1200 acts to adjust $\theta_{drp}$ 1048, the phase angle of the droop-controller modulation waveform presented to the pulse-width modulator 118.

In the $I_{dmin}$ limiting controller 1402, the filtered direct current component $I_{df}$ 1044 is applied to a negative input of a summing point 1410 at which $I_{dmin}$ 1406 is applied to a positive input of the summing point 1410 to determine a minimum error signal $ES_{min}$ 1412. A proportional component 1414 applies $k_{pIdmin}$ 1416, a proportional gain of the $I_{dmin}$ limiting controller 1402, to $ES_{min}$ 1412. An integral component 1418 sums the minimum error signal $ES_{min}$ 1412 subject to $k_{iIdmin}$ 1420, an integral gain of the $I_{dmin}$ limiting controller 1402, up to $O_{HLim}$ 1422, an upper limit of the limiting controllers 1402 and 1404. Outputs of the proportional component 1414 and the integral component 1418 are combined at a summing point 1424 and summed at an integral component 1426 to $\omega_{HLim}$ 1422 to yield an output of the $I_{dmin}$ limiting controller 1402, $\Delta\omega_{min}$ 1428.

In the $I_{dmax}$ limiting controller 1404, the filtered direct current component $I_{df}$ 1044 is applied to a negative input of a summing point 1430 at which $I_{dmax}$ 1408 is applied to a positive input of the summing point 1430 to determine a maximum error signal $ES_{max}$ 1432. A proportional component 1434 applies $k_{pIdmax}$ 1436, a proportional gain of the $I_{dmax}$ limiting controller 1404, to $ES_{m}ax$ 1432. An integral component 1438 sums the maximum error signal $ES_{max}$ 1432 subject to $k_{iIdmax}$ 1440, an integral gain of the $I_{dmax}$ limiting controller 1404, from $\omega_{LLim}$ 1442, a lower limit of the limiting controllers 1402 and 1404. Outputs of the proportional component 1434 and the integral component 1438 are combined at a summing point 1444 and summed at an integral component 1446 from $\omega_{LLim}$ 1442 to yield an output of the $I_{dmax}$ limiting controller 1404, $\Delta\omega_{max}$ 1448. The outputs $\Delta\omega_{min}$ 1428 and $\Delta\omega_{max}$ 1448 are combined at a summing point 1450 to yield an output $\Delta\omega_{Lim}$ 1452.

A portion of the active current-limiting subsystem 1400 is a P-f droop controller 1454. The P-f droop controller 1454 receives the filtered active power $P_f$ 1028. At a summing point 1456, $P_f$ 1028 is subtracted from $P_{set}$ 1458, an active power setpoint that is configurable when the active current-limiting subsystem 1400 is programmed. A P-f droop gain $m_p$ 1460, that also may be set when the active current-limiting subsystem 1400 is programmed, is applied to the output of the summing point 1456 at a proportional component 1462 to yield $\Delta\omega_{drp}$ 1464, the output of the P-f droop controller 1454.

$\Delta\omega_{drp}$ 1464 is combined at a summing point 1466 with $\Delta\omega_{Lim}$ 1452 to yield $\Delta\omega$ 1468. At an additional summing point 1470, $\Delta\omega_{PLL}$ 1472, the output of the phase-locked loop 1050 coupled in a feedback loop with the output of the grid-forming inverter 100 (FIG. 10) and further described below, is subtracted from $\Delta\omega$ 1468. At a proportional component 1474, $\omega_0$ 1476, a rated angular frequency of the grid-forming inverter 100 is applied to the difference of $\Delta\omega$ 1468 and $\Delta\omega_{PLL}$ 1472 at the output of the summing point 1470. The output of the proportional component 1474 is summed at an integral component 1478 from $\delta_{XLmin}$ 1480 to $\delta_{XLmax}$ 1482 to yield a phase angle $\delta_{XL}$ 1484, where $\delta_{XLmin}$ 1480 and $\delta_{XLmx}$ 1482 are the programmable lower and upper limits of the phase angle $\delta_{XL}$ 1484, respectively. At a summing point 1486, the phase angle $\delta_{XL}$ 1484 is combined with $\theta_{PLL}$ 1488, a phase-angle output of the phase-locked loop 1050, to generate $\theta_{drp}$ 1048, the phase angle of the droop-controller modulation waveform to be presented to the pulse-width modulator 118.

Figure 15:
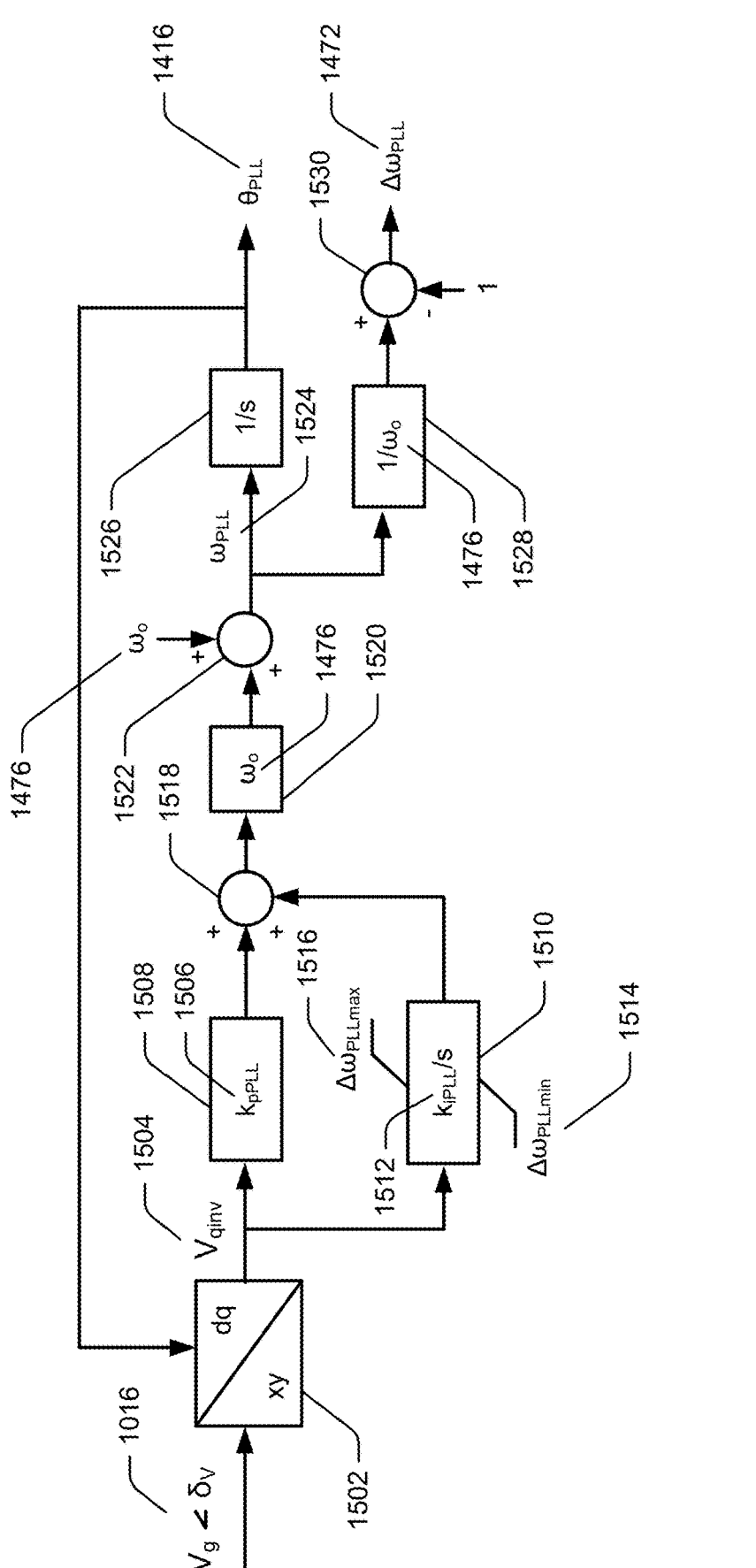
FIG. 15 is a block diagram of a phase-locked loop usable to provide input to the active and reactive current-limiting subsystem from outputs of the grid-forming inverter of FIG. 10.

As noted, the previously-described implementation of the active current-limiting subsystem 1400 is dependent upon input from a phase-locked loop 1050 coupled to the output 104 of the grid-forming inverter 100 in a feedback configuration. FIG. 15 depicts an example of a suitable phase-locked loop system 1500 that may be used to provide the needed inputs to the active current-limiting subsystem 1400.

Outputs of the phase-locked loop system 1500 include $\theta_{PLL}$ 1488, the phase angle output of the phase-locked loop 1500, and $\Delta\omega_{PLL}$ 1472, the angular frequency difference output of the phase-locked loop 1500 (see FIG. 15), are derived from first submitting $V_g\angle\delta_{drp}$ 1108 (FIG. 11) to the Park Transform 1502. The Park Transform 1502 receives a feedback input of $O_{PLL}$ 1488. An output of the Park Transform 1502, $V_{qinv}$ 1504 adjusted by $K_{pPLL}$ 1506, the phase-locked loop proportional gain, at a proportional component 1508. At an integral component 1510, $V_{qinv}$ 1504 is summed according to $k_{iPLL}$ 1512, an integral gain of the phase-locked loop 1500, over time from $\Delta\omega_{PLLmin}$ 1514, a programmable lower limit of the phase-locked loop 1500, to $\Delta\omega_{PLLmax}$ 1516, a programmable upper limit of the phase-locked loop 1500. Outputs of the proportional component 1508 and the integral component 1510 are combined at a summing point 1518. A proportional component 1520 applies $\omega_o$ 1476, the rated angular frequency, to the output of the summing point 1518. The output of the proportional component 1520 is then combined at a summing point 1522 with $\omega_o$ 1476 to yield $\omega_{PLL}$ 1524. $\omega_{PLL}$ 1524 is averaged over time at an inverter 1526 to yield $O_{PLL}$ 1488, the phase angle output of the phase-locked loop 1500. $\omega_{PLL}$ 1524 is also divided by the rated angular frequency $\omega_o$ 1476 at an inverter 1528 and 1 is subtracted from the output at a summing point 1530 to yield $\Delta\omega_{PLL}$ 1472, the output of the phase-locked loop 1500.

In operation, the active and reactive current-limiting subsystem 108 operates in concert with the instantaneous current-limiting subsystem 106, much as shock absorbers work in concert with the springs in a vehicle. The springs in a vehicle protect the vehicle from abrupt bumps by absorbing the energy within the springs, but then the vehicle may bounce as the springs try to discharge the energy absorbed from the bumps. The shock absorbers dampen the energy absorbed by the springs to smooth the ride. In this case, the instantaneous current-limiting subsystem protects transistors from "bumps" that might result from excessive currents flowing through the inverter 210 by redirecting the currents—but the redirected currents might cause undesired movement in the AC output of the grid-forming inverted. The active and reactive current-limiting subsystems 108, analogous to the shock absorbers, then correct the AC output of the grid-forming inverter 100 to provide a sinusoidal AC waveform expected by the grid—absorbing the bumps of excessive currents and smoothing the resulting output.

Programmability of Active and Reactive Current-Limiting

It will be appreciated that a user of the grid-forming inverter 100 may adjust inputs such as $I_{dmin}$ 1406 and $I_{dmax}$ 1408 to affect the phase angle of the droop-controller modulation waveform $\theta_{drp}$ and inputs such as $I_{qmin}$ 1206 and $I_{qmax}$ 1208 to affect the magnitude of the droop controller modulation waveform $E_{drp}$ 1036, the output of the reactive current-limiting subsystem 1200 (see FIG. 12), and the output of the active current system 1400 (see FIG. 14). Values of $I_{qmin}$ 1206, $I_{qmax}$ 1208, $I_{dmin}$ 1406, and $I_{dmax}$ 1408 may be selected to prioritize measurable reactive power (Q) or measurable active power (P). In implementations, a process may be employed to aid in the selection of the values of $I_{qmin}$ 1206, $I_{qmax}$ 1208, $I_{dmin}$ 1406, and $I_{dmax}$ 1408 to prioritize measurable reactive power Q or measurable active power P.

Figure 16:
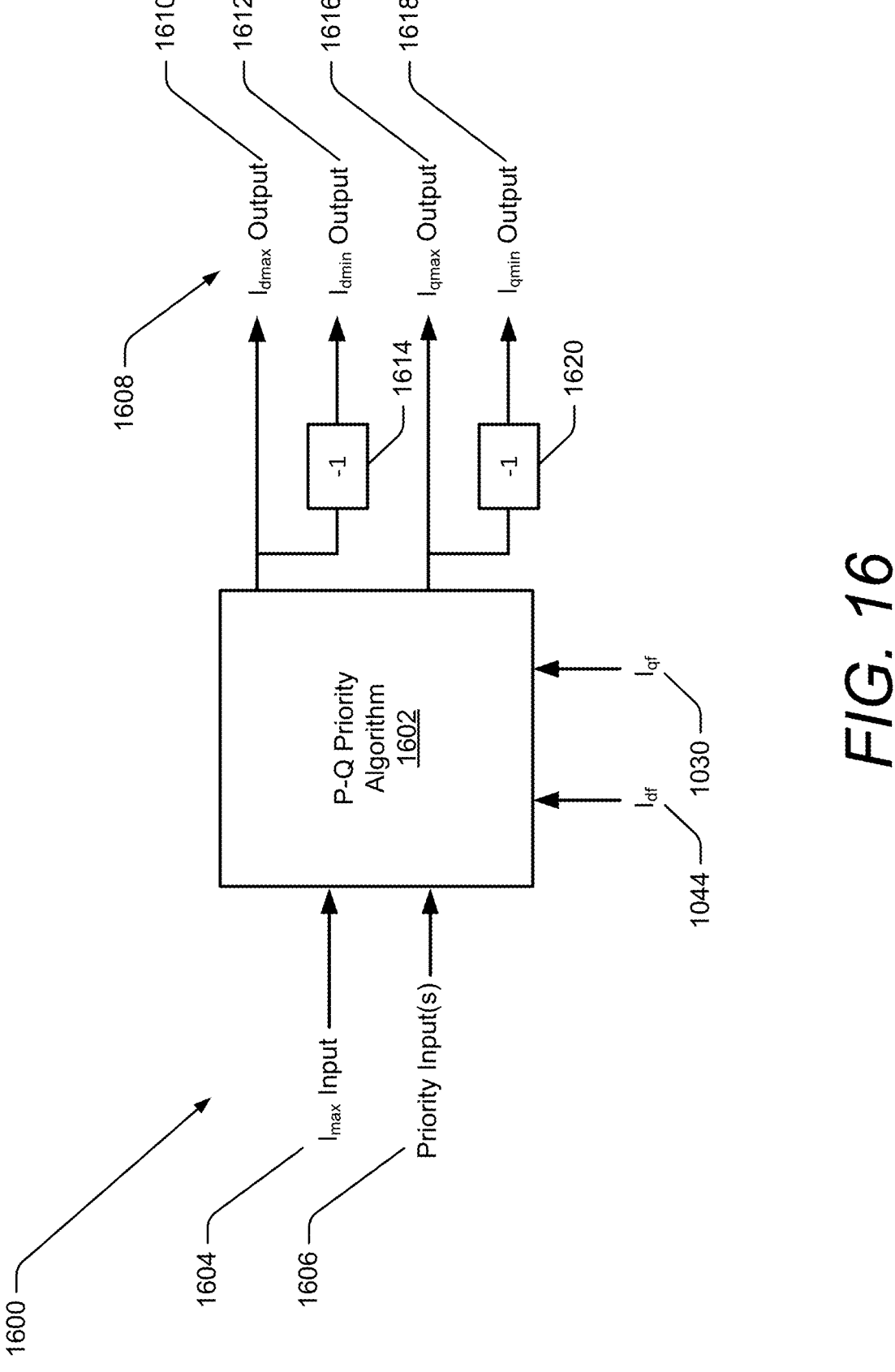
FIG. 16 is a block diagram of a priority selection system that enables a user to prioritize measurable reactive power Q or measurable active power P.

FIG. 16 depicts a priority selection system 1600. In the implementation of FIG. 16, the priority selection system 1600 generated current parameter using a P-Q priority algorithm 1602 that enables a user to prioritize measurable reactive power Q or measurable active power P, as described below. The P-Q priority algorithm 1602 receives an Imax input 1604 to specify an inverter-maximum steady-state output current. The P-Q priority algorithm 1602 also receives one or more priority inputs 1606 to enable prioritization of measurable reactive power Q or measurable active power P, as described below. Outputs 1608 of the P-Q priority algorithm 1602 include an $I_{dmax}$ output 1610, an $I_{dmin}$ output 1612 (which may be generated as an inverse 1614 of the $I_{dmax}$ output 1610), an $I_{qmax}$ output 1616, and an $I_{qmin}$ output 1618 (which may be generated as an inverse 1620 of the $I_{qmax}$ output 1610). In implementations, the P-Q priority algorithm 1602 also receives feedback inputs of the filtered direct current component $I_{df}$ 1044 and a filtered inverter bridge-side current q component $I_{qf}$ 1030 (see FIG. 10).

In implementations, the outputs 1608 may be directly coupled to respective inputs of the active and reactive current-limiting subsystem 108. For example, the $I_{dmax}$ output 1610 and the $I_{dmin}$ output 1612 may be operatively coupled with the $I_{dmax}$ input 1408 and the $I_{dmin}$ input 1406 of the active current-limiting subsystem 1400 (see FIG. 14), respectively, and the $I_{qmax}$ output 1616 and the $I_{qmin}$ output 1618 may be operatively coupled with the $I_{qmax}$ input 1208 and the $I_{qmin}$ input 1206 of the reactive current-limiting subsystem 1200 (see FIG. 12), respectively. Thus, inputs 1604 and 1606 to the P-Q priority algorithm 1602 may directly configure a grid-forming inverter 100 incorporating the priority selection system 1600.

Measurable active power P or measurable reactive power Q may be determined by the $I_{max}$ input 1604 and one or more tuning parameters presented as the one or more priority inputs 1606. For example, Eq. (10) enables a user to prioritize the measurable active power P by adjusting a coefficient $k_{PF}$, presented as one of the priority inputs 1606, to adjust the $I_{qmax}$ output 1616:

$$I_{dmax} = k_{PF}I_{max} \qquad (10)$$

Eq. (11) determines the $I_{qmax}$ output 1616 as a function of the $I_{max}$ input 1604 and the filtered direct current component $I_{df}$ 1044:

$$I_{qmax} = \sqrt{I_{max}2 - I_{df}2} \qquad (11)$$

Eq. (12) enables a user to prioritize the measurable reactive power Q by adjusting a coefficient $k_{QF}$, presented as one of the priority inputs 1606, to adjust the $I_{qmax}$ output 1616 to adjust the $I_{qmax}$ output 1616:

$$I_{qmax} = k_{QF}I_{max} \qquad (12)$$

Eq. (13) determines the $I_{dmax}$ output 1610 as a function of the $I_{max}$ input 1604 and the filtered inverter bridge-side current q component $I_{qf}$ 1030:

$$I_{dmax} = \sqrt{I_{max}2 - I_{qf}2} \qquad (13)$$

By adjusting the coefficients $k_{PF}$ and $k_{QF}$, a user can configure the outputs, including the $I_{dmax}$ output 1610 and the $I_{qmax}$ output 1616. The values of the $I_{dmax}$ output 1610 and the $I_{qmax}$ output 1616 are used by the active and reactive current-limiting subsystem 108 to provide inputs to the pulse-width modulator 118 that will shape the output of the converter 112 (FIG. 10).

Effects of Instantaneous Current-Limiting Subsystem and of Active and Reactive Current-Limiting Subsystem on AC Output of the Grid-Forming Inverter As previously described, the combination of the instantaneous current-limiting subsystem 106 protects the transistors 224, 228, 232, 234, 236, and 238 in the inverter 210 from damage resulting in an overcurrent situation by rerouting currents 204, 206, and 208 around one or more of the transistors 224, 228, 232, 234, 236, and 238 (see FIG. 2). However, rerouting the currents 204, 206, and 208, may disturb the sinusoidal AC current that the pulse-width modulator 118 and the inverter 210 are configured to generate. Using filtered inputs derived from the output 104 of the grid-forming inverter 100, the active and reactive current-limiting subsystem 108 (FIG. 2) adjusts the inputs to the pulse-width modulator 118 to compensate for changes in the output 104 of the grid-forming inverter to shape the AC current waveform to synchronize the output 104 of the grid-forming inverter 100.

Figures 17, 18:
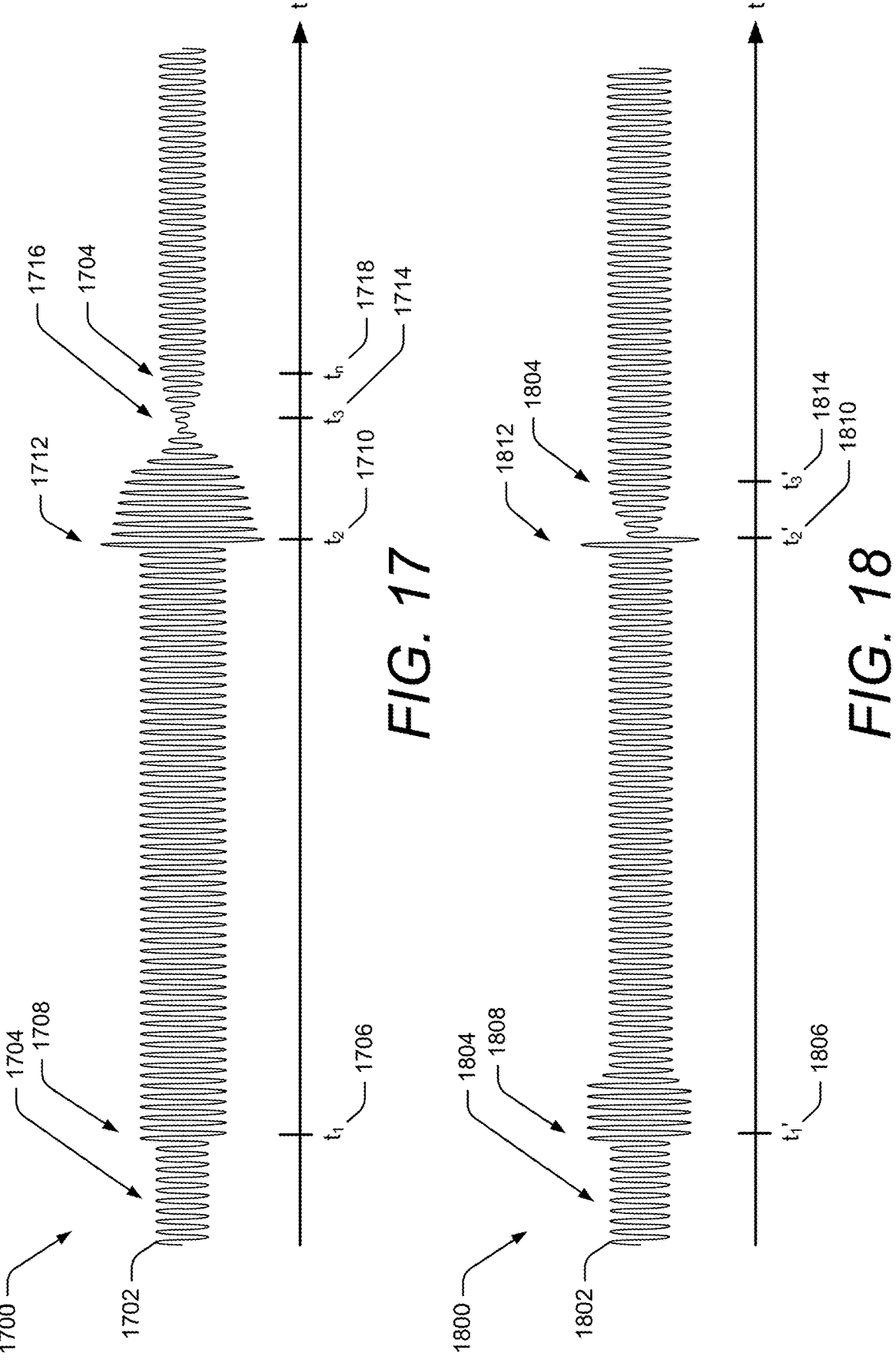
FIG. 17 is a graph of a disrupted current output caused by one or more currents being rerouted in an inverter.
FIG. 18 is a graph of the disrupted current output of FIG. 17 adjusted by an active and reactive current-limiting subsystem.

FIG. 17 shows a plot 1700 of a representative current waveform 1702, e.g., of current 204, 206, or 208, generated by the inverter 210 (see FIG. 2), which is one of the constituent components of the current output of the grid-forming inverter 100. In a nominal form 1704, where the current 204, 206, and/or 208 is not disturbed by any fault events, the current waveform 1702 is a sinusoidal wave that constitutes a portion of the output of the grid-forming inverter 100. At a time $t_1$ 1706, an event, such as the short circuit described with reference to FIGS. 5A and 5B, results in a disruption 1708 to the current waveform 1702. As previously described, the instantaneous current-limiting subsystem 106 may result in modified gate signals 110 disabling one or more of the transistors 224, 228, 232, 234, 236, and 238 to prevent an excessive current from damaging one or more of the transistors 224, 228, 232, 234, 236, and 238 and, instead, redirects the overcurrent back to the DC power source $V_{DC}$ 102 to allow that current to dissipate. Ordinarily, the pulse-width modulator 118 controls the transistors 224, 228, 232, 234, 236, and 238 to modulate the currents 204, 206, or 208 to generate a sinusoidal AC waveform. However, redirecting one of the currents 204, 206, or 208 may disrupt the current waveform 1702 representing the currents 204, 206, or 208.

As a result of the redirecting of one or more of the currents 204, 206, or 208, the disruption will dissipate over time. For instance, in the example of FIG. 17, by a time $t_2$ 1710, the instantaneous current-limiting subsystem 106 will cease redirecting the currents 204, 206, and/or 208 as a result of the application of the modified gate signals 110, which may lead to an additional disruption 1712 in the current waveform 1702. Between the time $t_2$ 1710 and a time $t_3$ 1714, irregularities in the current waveform will dampen to a reduced amplitude waveform 1716. Then, by a time $t_n$ 1718, the current waveform will resume the nominal form 1704.

Using an implementation of the active and reactive current-limiting subsystem 108, the output current may resume a nominal form more quickly. FIG. 18 shows a plot 1800 of a representative current waveform 1802, e.g., of current 204, 206, or 208, generated by the inverter 210 (see FIG. 2), which is one of the constituent components of the current output of the grid-forming inverter 100. In a nominal form 1804, where the current 204, 206, and/or 208 is not disturbed by any fault events, the current waveform 1802 is a sinusoidal wave that constitutes a portion of the output of the grid-forming inverter 100.

At a time $t_{1'}$ 1806, a disruption 1808 occurs in the current waveform 1802 as a result of a fault. At a time $t_{2'}$ 1810 when the instantaneous current-limiting subsystem 106 ceases redirecting the currents 204, 206, and/or 208 through application of the modified gate signals 110, an additional disruption 1812 occurs in the current waveform. Between the time $t_{2'}$ 1810 and a time $t_{1'}$ 1814, under the control of the active and reactive current-limiting subsystem 108, the current waveform 1802 will resume the nominal 1804, more quickly than the current waveform 1702 the nominal form 1704 (see FIG. 17) was resumed without the intervention of the active and reactive current-limiting subsystem 108.

Example Method of Active and Reactive Current Limiting

FIG. 19 is a flow diagram of an example method 1900 for implementing active and reactive current-limiting control to adjust an output of a grid-forming inverter as previously described with reference to FIGS. 10-18. At block 1902, one or more outputs of the grid-forming inverter are monitored including a reactive power and an active power, as previously described with reference to FIGS. 10 and 11-14. At block 1904, based at least in part on the reactive power, a first signal is generated that represents a magnitude of a modulation waveform presentable to a pulse-width modulator configured to direct transistors in an inverter of the grid-forming inverter. At block 1906, based at least in part on the active power, a second signal is generated that represents a rotating phase angle of the modulation waveform presentable to the pulse-width modulator. The pulse-width modulator generates gate signals that selectively activate transistors in the inverter that shape the AC output of the inverter. At block 1908, the first signal and the second signal are adjusted to cause an alternating current (AC) output of the grid-forming inverter to resume a nominal form subsequent to current being directed around one or more transistors in an inverter of the grid-forming inverter to prevent an output current exceeding an inverter-maximum transient output current (ImaxF 250) from flowing through the one or more transistors. Thus, while the instantaneous current-limiting subsystem 106 (FIGS. 1 and 10) protect the transistors in the inverter from excessive current flowing through them, the active and reactive current-limiting subsystem adjusts the inputs to the pulse-width modulator 118 to cause the pulse-width modulator 118 to adjust gate signals to the transistors to correct for the current diversions and correct the form of the AC output.

Example Method of Two-Stage Current Limiting

FIG. 20 is a flow diagram of an example method 2000 of two-stage current-limiting including both instantaneous current-limiting and active and reactive current-limiting. At block 2002, responsive to an overcurrent situation, current is redirected around one or more transistors in an inverter of a grid-forming inverter to prevent an output current exceeding an inverter-maximum transient output current from flowing through one or more of the transistors, as described with reference to FIGS. 2-9. At block 2004, one or more outputs of the grid-forming inverter, including a reactive power and an active power, are monitored. At block 2006, based at least in part on the reactive power, a first signal is generated that represents a magnitude of a modulation waveform presentable to a pulse-width modulator configured to direct transistors in an inverter of the grid-forming inverter, as previously described with reference to FIGS. 10 and 12-14. At block 2008, based at least in part on the active power, a second signal is generated representing a rotating phase angle of the modulation waveform presentable to the pulse-width modulator. At block 2010, the first signal and the second signal are adjusted to cause an alternating current (AC) output of the grid-forming inverter to resume a nominal form subsequent to the current being directed around the one or more transistors in the inverter of the grid-forming inverter to prevent the output current exceeding the inverter-maximum transient output current from flowing through the one or more transistors.

This document describes systems and techniques for a two-stage current-limiting control strategy for direct-droop-controlled grid-forming inverters. These systems and techniques may be realized using one or more of the entities or components shown in FIGS. 1-8, 10, and 12-17 and used as described with reference to the example methods of FIGS. 9, 19, and 20. However, the figures illustrate only some of the many possible systems capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

ADDITIONAL EXAMPLES

Some additional examples of systems and techniques for a two-stage current-limiting control strategy for direct-droop-controlled grid-forming inverters are as follows:

Example 1. A control system for a grid-forming inverter including an instantaneous current-limiting subsystem configured to redirect one or more currents in an inverter in response to a current disturbance, comprising: feedback inputs receiving one or more outputs of the grid-forming inverter including a reactive power and an active power; a reactive power current-limiting subsystem based at least in part on the reactive power, the reactive power current-limiting subsystem being configured to generate a first signal representing a magnitude of a modulation waveform presentable to a pulse-width modulator configured to direct transistors in the inverter of the grid-forming inverter; and an active power current-limiting subsystem based at least in part on the active power, the active power current-limiting subsystem being configured to generate a second signal representing a rotating phase angle of the modulation waveform presentable to the pulse-width modulator, the reactive power current-limiting subsystem and active power current-limiting subsystem being configured to cause an alternating current (AC) output of the grid-forming inverter to resume a nominal form subsequent to current being directed around one or more transistors in an inverter of the grid-forming inverter to prevent an output current exceeding an inverter-maximum transient output current from flowing through the one or more transistors.

Example 2. The control system of Example 1, wherein the control system is further configured to convert signals included in the one or more outputs from an original frame of reference into direct and quadrature components in a rotating frame of reference.

Example 3. The control system of Example 2, wherein the reactive power current-limiting subsystem is further configured to generate the first signal representing the magnitude of the modulation waveform based on a quadrature component of a current output of the grid-forming inverter.

Example 4. The control system of Example 3, wherein the reactive power current-limiting subsystem includes first proportional and integral controllers configured to respond to the quadrature component of the current output of the grid-forming inverter relative to selected minimum and maximum values of the quadrature component of the current output of the grid-forming inverter.

Example 5. The control system of Example 4, wherein the reactive power current-limiting subsystem is further configured to adjust the first signal relative to a voltage setpoint based on a direct component of a voltage output of the grid-forming inverter.

Example 6. The control system of Example 2, wherein the active power current-limiting subsystem is further configured to generate the second signal representing the phase angle of the modulation waveform based on a direct component of a current output of the grid-forming inverter.

Example 7. The control system of Example 6, wherein the active power current-limiting subsystem includes second proportional and integral controllers configured to respond to the direct component of the current output of the grid-forming inverter relative to selected minimum and maximum values of the direct component of the current output of the grid-forming inverter.

Example 8. The control system of Example 1, further comprising one or more low-pass filters configured to receive the one or more outputs of the grid-forming inverter and to generate one or more filtered outputs of the grid-forming inverter.

Example 9. The control system of Example 1, further comprising an active and reactive power priority selection system configured to receive one or more priority inputs selectable to determine current outputs that are presented as inputs to the active current-limiting subsystem and the reactive power current-limiting subsystem.

Example 10. A single-loop droop controller for a grid-forming inverter comprising: an instantaneous current-limiting subsystem configured to redirect one or more currents around one or more transistors in an inverter when the one or more currents exceed an inverter-maximum transient output current; an active and reactive current-limiting subsystem including feedback inputs receiving one or more outputs of the grid-forming inverter including a reactive power and an active power, including: a reactive power current-limiting subsystem based at least in part on the reactive power, the reactive power current-limiting subsystem being configured to generate a first signal representing a magnitude of a modulation waveform presentable to a pulse-width modulator configured to direct transistors in the inverter of the grid-forming inverter; and an active power current-limiting subsystem based at least in part on the active power, the active power current-limiting subsystem being configured to generate a second signal representing a rotating phase angle of the modulation waveform presentable to the pulse-width modulator, the reactive power current-limiting subsystem and active power current-limiting subsystem being configured to cause an alternating current output of the grid-forming inverter to resume a nominal form subsequent to current being directed around one or more transistors in an inverter of the grid-forming inverter to prevent an output current exceeding the inverter-maximum transient output current from flowing through the one or more transistors.

Example 11. The single-loop droop controller of Example 10, wherein the instantaneous current-limiting subsystem includes: a hysteresis module configured to compare an output current detected across one or more transistors in an inverter controlled by the single-loop droop controller with the inverter-maximum transient output current and to generate an overcurrent signal, the overcurrent signal presenting a fault signal responsive to the output current exceeding the inverter-maximum transient output current; and a logic array configured to logically combine a plurality of gate signals generated by a pulse-width modulator with the overcurrent signal to present modified gate signals to the one or more transistors, the logic array being configured to replace one or more of the gate signals in the modified gate signals with a gate disable signal responsive to the overcurrent signal presenting the fault signal to prevent the output current from flowing through the one or more transistors.

Example 12. The single-loop droop controller of Example 10, wherein the active and reactive current-limiting subsystem is further configured to convert signals included in the one or more the outputs from an original frame of reference into direct and quadrature components in a rotating frame of reference.

Example 13. The single-loop droop controller of Example 12, wherein the reactive power current-limiting subsystem is further configured to generate the first signal representing the magnitude of the modulation waveform based on a quadrature component of a current output of the grid-forming inverter.

Example 14. The single-loop droop controller of Example 13, wherein the reactive power current-limiting subsystem includes first proportional and integral controllers configured to respond to the quadrature component of the current output of the grid-forming inverter relative to selected minimum and maximum values of the quadrature component of the current output of the grid-forming inverter.

Example 15. The single-loop droop controller of Example 14, wherein the reactive power current-limiting subsystem is further configured to adjust the first signal relative to a voltage setpoint based on a direct component of a voltage output of the grid-forming inverter.

Example 16. The single-loop droop controller of Example 12, wherein the active power current-limiting subsystem is further configured to generate the second signal representing the phase angle of the modulation waveform based on a direct component of a current output of the grid-forming inverter.

Example 17. A method of adjusting control signals in a grid-forming inverter including an instantaneous current-limiting subsystem configured to redirect one or more currents in an inverter in response to a current disturbance, comprising: monitoring one or more outputs of the grid-forming inverter including a reactive power and an active power; based at least in part on the reactive power, generating a first signal representing a magnitude of a modulation waveform presentable to a pulse-width modulator configured to direct transistors in the inverter of the grid-forming inverter; based at least in part on the active power, generating a second signal representing a rotating phase angle of the modulation waveform presentable to the pulse-width modulator; and adjusting the first signal and the second signal to cause an alternating current (AC) output of the grid-forming inverter to resume a nominal form subsequent to current being directed around one or more transistors in an inverter of the grid-forming inverter to prevent an output current exceeding an inverter-maximum transient output current from flowing through the one or more transistors.

Example 18. The method of Example 17, further comprising converting signals that include the one or more outputs from an original frame of reference into direct and quadrature components in a rotating frame of reference.

Example 19. The method of Example 18, further comprising generating the first signal representing the magnitude of the modulation waveform based on a direct component of a voltage output of the grid-forming inverter and a quadrature component of the current output of the grid-forming inverter.

Example 20. The method of Example 18, further comprising generating the second signal representing the phase angle of the modulation waveform based on a direct component of the current output of the grid-forming inverter.

Conclusion

Although implementations of systems and techniques for a two-stage current-limiting control strategy for direct-droop-controlled grid-forming inverters have been described in language specific to certain features and/or methods, the subject of the appended claims is not necessarily limited to the specific features or methods described. Rather, the specific features and methods are disclosed as example implementations of systems and techniques for a two-stage current-limiting control strategy for direct-droop-controlled grid-forming inverters.

What is claimed is:

1. A control system for a grid-forming inverter including an instantaneous current-limiting subsystem configured to redirect one or more currents in an inverter in response to a current disturbance, comprising:

feedback inputs receiving one or more outputs of the grid-forming inverter including a reactive power and an active power;

a reactive power current-limiting subsystem based at least in part on the reactive power, the reactive power current-limiting subsystem being configured to generate a first signal representing a magnitude of a modulation waveform presentable to a pulse-width modulator configured to direct transistors in the inverter of the grid-forming inverter; and an active power current-limiting subsystem based at least in part on the active power, the active power current-limiting subsystem being configured to generate a second signal representing a rotating phase angle of the modulation waveform presentable to the pulse-width modulator, the reactive power current-limiting subsystem and active power current-limiting subsystem being configured to cause an alternating current (AC) output of the grid-forming inverter to resume a nominal form subsequent to current being directed around one or more transistors in an inverter of the grid-forming inverter to prevent an output current exceeding an inverter-maximum transient output current from flowing through the one or more transistors.

2. The control system of claim 1, wherein the control system is further configured to convert signals included in the one or more outputs from an original frame of reference into direct and quadrature components in a rotating frame of reference.

3. The control system of claim 2, wherein the reactive power current-limiting subsystem is further configured to generate the first signal representing the magnitude of the modulation waveform based on a quadrature component of a current output of the grid-forming inverter.

4. The control system of claim 3, wherein the reactive power current-limiting subsystem includes first proportional and integral controllers configured to respond to the quadrature component of the current output of the grid-forming inverter relative to selected minimum and maximum values of the quadrature component of the current output of the grid-forming inverter.

5. The control system of claim 4, wherein the reactive power current-limiting subsystem is further configured to adjust the first signal relative to a voltage setpoint based on a direct component of a voltage output of the grid-forming inverter.

6. The control system of claim 2, wherein the active power current-limiting subsystem is further configured to generate the second signal representing the phase angle of the modulation waveform based on a direct component of a current output of the grid-forming inverter.

7. The control system of claim 6, wherein the active power current-limiting subsystem includes second proportional and integral controllers configured to respond to the direct component of the current output of the grid-forming inverter relative to selected minimum and maximum values of the direct component of the current output of the grid-forming inverter.

8. The control system of claim 1, further comprising one or more low-pass filters configured to receive the one or more outputs of the grid-forming inverter and to generate one or more filtered outputs of the grid-forming inverter.

9. The control system of claim 1, further comprising an active and reactive power priority selection system configured to receive one or more priority inputs selectable to determine current outputs that are presented as inputs to the active current-limiting subsystem and the reactive power current-limiting subsystem.

10. A single-loop droop controller for a grid-forming inverter comprising:

an instantaneous current-limiting subsystem configured to redirect one or more currents around one or more transistors in an inverter when the one or more currents exceed an inverter-maximum transient output current;

an active and reactive current-limiting subsystem including feedback inputs receiving one or more outputs of the grid-forming inverter including a reactive power and an active power, including:

a reactive power current-limiting subsystem based at least in part on the reactive power, the reactive power current-limiting subsystem being configured to generate a first signal representing a magnitude of a modulation waveform presentable to a pulse-width modulator configured to direct transistors in the inverter of the grid-forming inverter; and an active power current-limiting subsystem based at least in part on the active power, the active power current-limiting subsystem being configured to generate a second signal representing a rotating phase angle of the modulation waveform presentable to the pulse-width modulator, the reactive power current-limiting subsystem and active power current-limiting subsystem being configured to cause an alternating current output of the grid-forming inverter to resume a nominal form subsequent to current being directed around one or more transistors in an inverter of the grid-forming inverter to prevent an output current exceeding the inverter-maximum transient output current from flowing through the one or more transistors.

11. The single-loop droop controller of claim 10, wherein the instantaneous current-limiting subsystem includes:

a hysteresis module configured to compare an output current detected across one or more transistors in an inverter controlled by the single-loop droop controller with the inverter-maximum transient output current and to generate an overcurrent signal, the overcurrent signal presenting a fault signal responsive to the output current exceeding the inverter-maximum transient output current; and a logic array configured to logically combine a plurality of gate signals generated by a pulse-width modulator with the overcurrent signal to present modified gate signals to the one or more transistors, the logic array being configured to replace one or more of the gate signals in the modified gate signals with a gate disable signal responsive to the overcurrent signal presenting the fault signal to prevent the output current from flowing through the one or more transistors.

12. The single-loop droop controller of claim 10, wherein the active and reactive current-limiting subsystem is further configured to convert signals included in the one or more the outputs from an original frame of reference into direct and quadrature components in a rotating frame of reference.

13. The single-loop droop controller of claim 12, wherein the reactive power current-limiting subsystem is further configured to generate the first signal representing the magnitude of the modulation waveform based on a quadrature component of a current output of the grid-forming inverter.

14. The single-loop droop controller of claim 13, wherein the reactive power current-limiting subsystem includes first proportional and integral controllers configured to respond to the quadrature component of the current output of the grid-forming inverter relative to selected minimum and maximum values of the quadrature component of the current output of the grid-forming inverter.

15. The single-loop droop controller of claim 14, wherein the reactive power current-limiting subsystem is further configured to adjust the first signal relative to a voltage setpoint based on a direct component of a voltage output of the grid-forming inverter.

16. The single-loop droop controller of claim 12, wherein the active power current-limiting subsystem is further configured to generate the second signal representing the phase angle of the modulation waveform based on a direct component of a current output of the grid-forming inverter.

17. A method of adjusting control signals in a grid-forming inverter including an instantaneous current-limiting subsystem configured to redirect one or more currents in an inverter in response to a current disturbance, comprising:

monitoring one or more outputs of the grid-forming inverter including a reactive power and an active power;

based at least in part on the reactive power, generating a first signal representing a magnitude of a modulation waveform presentable to a pulse-width modulator configured to direct transistors in the inverter of the grid-forming inverter;

based at least in part on the active power, generating a second signal representing a rotating phase angle of the modulation waveform presentable to the pulse-width modulator; and adjusting the first signal and the second signal to cause an alternating current (AC) output of the grid-forming inverter to resume a nominal form subsequent to current being directed around one or more transistors in an inverter of the grid-forming inverter to prevent an output current exceeding an inverter-maximum transient output current from flowing through the one or more transistors.

18. The method of claim 17, further comprising converting signals that include the one or more outputs from an original frame of reference into direct and quadrature components in a rotating frame of reference.

19. The method of claim 18, further comprising generating the first signal representing the magnitude of the modulation waveform based on a direct component of a voltage output of the grid-forming inverter and a quadrature component of the current output of the grid-forming inverter.

20. The method of claim 18, further comprising generating the second signal representing the phase angle of the modulation waveform based on a direct component of the current output of the grid-forming inverter.

* * * * *